United States Patent
Call et al.

(10) Patent No.: US 10,187,408 B1
(45) Date of Patent: *Jan. 22, 2019

(54) DETECTING ATTACKS AGAINST A SERVER COMPUTER BASED ON CHARACTERIZING USER INTERACTIONS WITH THE CLIENT COMPUTING DEVICE

(71) Applicant: Shape Security, Inc, Mountain View, CA (US)

(72) Inventors: Justin D. Call, Santa Clara, CA (US); Xinran Wang, San Ramon, CA (US); Yao Zhao, Fremont, CA (US); Timothy Dylan Peacock, San Francisco, CA (US)

(73) Assignee: SHAPE SECURITY, INC., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/645,787

(22) Filed: Jul. 10, 2017

Related U.S. Application Data

(63) Continuation of application No. 14/672,879, filed on Mar. 30, 2015, now Pat. No. 9,705,902, which is a
(Continued)

(51) Int. Cl.
  *G06F 21/00* (2013.01)
  *H04L 29/06* (2006.01)
(Continued)

(52) U.S. Cl.
  CPC .......... *H04L 63/1416* (2013.01); *H04L 43/04* (2013.01); *H04L 67/02* (2013.01)

(58) Field of Classification Search
  None
  See application file for complete search history.

(56) References Cited

U.S. PATENT DOCUMENTS

| 5,509,076 A | 4/1996 | Sprunk |
| 6,654,707 B2 | 11/2003 | Wynn |

(Continued)

FOREIGN PATENT DOCUMENTS

| CN | 10147818 | 5/2011 |
| EP | 14730229 | 5/2017 |

(Continued)

OTHER PUBLICATIONS

CTNF, dated Feb. 7, 2017, re: Daniel G. Moen, U.S. Appl. No. 14/980,231, filed Dec. 28, 2015.

(Continued)

*Primary Examiner* — Maung T Lwin
(74) *Attorney, Agent, or Firm* — Hickman Palermo Becker Bingham LLP

(57) ABSTRACT

A computer-implemented method includes providing, for use by a third-party, injectable computer code that is capable of being served with other code provided by the third-party to client computing devices; receiving data from client computing devices that have been served the code by the third-party, the data including data that characterizes (a) the client computing devices and (b) user interaction with the client computing devices; classifying the client computing devices as controlled by actual users or instead by automated software based on analysis of the received data from the client computing devices; and providing to the third party one or more reports that characterize an overall level of automated software activity among client computing devices that have been served code by the third party.

7 Claims, 9 Drawing Sheets

Related U.S. Application Data continuation of application No. 14/255,248, filed on Apr. 17, 2014, now Pat. No. 8,997,226.

(51) Int. Cl.
*H04L 29/08* (2006.01)
*H04L 12/26* (2006.01)

(56) References Cited

U.S. PATENT DOCUMENTS

| | | |
|---|---|---|
| 7,058,699 B1 | 6/2006 | Chiou |
| 7,107,347 B1 | 9/2006 | Cohen |
| 7,117,429 B2 | 10/2006 | Vedullapalli |
| 7,398,553 B1 | 7/2008 | Li |
| 7,424,720 B2 | 9/2008 | Chagoly |
| 7,464,326 B2 | 12/2008 | Kawai |
| 7,849,502 B1 | 12/2010 | Bloch et al. |
| 7,870,610 B1 | 1/2011 | Mitchell |
| 7,895,653 B2 | 2/2011 | Calo |
| 8,086,756 B2 | 12/2011 | Kamyshenko |
| 8,086,957 B2 | 12/2011 | Bauchot |
| 8,170,020 B2 | 5/2012 | Frank |
| 8,181,104 B1 | 5/2012 | Helfand |
| 8,195,953 B1* | 6/2012 | Yue ............... G06F 21/566 713/187 |
| 8,453,126 B1 | 5/2013 | Ganelin |
| 8,533,480 B2 | 9/2013 | Pravetz |
| 8,555,388 B1 | 10/2013 | Wang |
| 8,561,193 B1 | 10/2013 | Srivastava |
| 8,578,499 B1 | 11/2013 | Zhu |
| 8,589,405 B1 | 11/2013 | Estan |
| 8,621,197 B2 | 12/2013 | Suryanarayana |
| 8,650,648 B2 | 2/2014 | Howard et al. |
| 8,677,481 B1 | 3/2014 | Lee |
| 8,689,330 B2 | 4/2014 | Sinn |
| 8,713,631 B1* | 4/2014 | Pavlyushchik ....... G06F 21/566 726/1 |
| 8,739,284 B1 | 5/2014 | Gardner |
| 8,752,208 B2 | 6/2014 | Shulman |
| 8,762,962 B2 | 6/2014 | Ben-Artzi |
| 8,843,820 B1 | 9/2014 | Kay |
| 8,869,281 B2 | 10/2014 | Call |
| 8,997,226 B1 | 3/2015 | Call |
| 9,225,729 B1 | 12/2015 | Moen |
| 9,225,737 B2 | 12/2015 | Call |
| 9,258,328 B2 | 2/2016 | Ibatullin et al. |
| 9,338,143 B2 | 5/2016 | Hansen |
| 9,356,954 B2 | 5/2016 | Zhou |
| 9,456,050 B1 | 9/2016 | Lepeska |
| 9,609,006 B2 | 3/2017 | Call |
| 9,628,498 B1 | 4/2017 | Aziz |
| 9,639,699 B1 | 5/2017 | Kurupati |
| 9,646,140 B2 | 5/2017 | Horadan |
| 9,680,850 B2 | 6/2017 | Rapaport |
| 9,686,300 B2 | 6/2017 | Kurupati |
| 9,705,902 B1 | 7/2017 | Call |
| 9,906,544 B1 | 2/2018 | Kurupati |
| 2002/0199116 A1 | 12/2002 | Hoene |
| 2004/0088651 A1 | 5/2004 | McKnight |
| 2005/0108554 A1 | 5/2005 | Rubin |
| 2005/0172338 A1 | 8/2005 | Sandu |
| 2005/0198099 A1 | 9/2005 | Motsinger |
| 2005/0216770 A1 | 9/2005 | Rowett |
| 2005/0240999 A1 | 10/2005 | Rubin |
| 2005/0251536 A1 | 11/2005 | Harik |
| 2005/0278626 A1 | 12/2005 | Malik |
| 2006/0053295 A1 | 3/2006 | Madhusudan |
| 2006/0101047 A1 | 5/2006 | Rice |
| 2006/0112179 A1* | 5/2006 | Baumeister ......... H04L 12/2805 709/226 |
| 2006/0230288 A1 | 10/2006 | Fox |
| 2006/0288418 A1 | 12/2006 | Yang |
| 2007/0011295 A1 | 1/2007 | Hansen |
| 2007/0064617 A1 | 3/2007 | Reyes |
| 2007/0074169 A1* | 3/2007 | Chess ................... G06F 21/54 717/126 |
| 2007/0074227 A1 | 3/2007 | Naidu |
| 2007/0088955 A1 | 4/2007 | Lee |
| 2007/0234070 A1 | 10/2007 | Horning |
| 2007/0239859 A1* | 10/2007 | Wilkinson ............ G06F 9/505 709/220 |
| 2008/0208785 A1 | 8/2008 | Trefler |
| 2009/0070459 A1 | 3/2009 | Cho |
| 2009/0099988 A1 | 4/2009 | Stokes |
| 2009/0204820 A1* | 8/2009 | Brandenburg ........ G06Q 10/06 713/182 |
| 2009/0241174 A1 | 9/2009 | Rajan |
| 2009/0292791 A1 | 11/2009 | Livshits |
| 2009/0292984 A1 | 11/2009 | Bauchot |
| 2010/0077481 A1* | 3/2010 | Polyakov ............. G06F 21/552 726/24 |
| 2010/0088404 A1 | 4/2010 | Mani |
| 2010/0106611 A1 | 4/2010 | Paulsen |
| 2010/0142382 A1 | 6/2010 | Jungck et al. |
| 2010/0180344 A1* | 7/2010 | Malyshev ............. G06F 21/566 726/23 |
| 2010/0218253 A1 | 8/2010 | Andrew |
| 2010/0235637 A1 | 9/2010 | Lu |
| 2010/0235910 A1 | 9/2010 | Ku |
| 2010/0287132 A1 | 11/2010 | Hauser |
| 2011/0035733 A1 | 2/2011 | Horning |
| 2011/0107077 A1 | 5/2011 | Henderson |
| 2011/0154308 A1 | 6/2011 | Lobo |
| 2011/0167494 A1* | 7/2011 | Bowen .................. G06F 21/566 726/24 |
| 2011/0225234 A1 | 9/2011 | Amit |
| 2011/0231305 A1 | 9/2011 | Winters |
| 2011/0255689 A1 | 10/2011 | Bolotov |
| 2011/0320816 A1 | 12/2011 | Yao |
| 2012/0036576 A1 | 2/2012 | Iyer |
| 2012/0054057 A1* | 3/2012 | O'Connell ............. G06F 21/36 705/26.1 |
| 2012/0090030 A1 | 4/2012 | Rapaport |
| 2012/0198528 A1 | 8/2012 | Baumhof |
| 2012/0216251 A1 | 8/2012 | Kumar |
| 2012/0254727 A1 | 10/2012 | Jain |
| 2012/0255006 A1 | 10/2012 | Aly et al. |
| 2012/0324236 A1 | 12/2012 | Srivastava |
| 2013/0047255 A1 | 2/2013 | Dalcher |
| 2013/0086679 A1 | 4/2013 | Beiter |
| 2013/0091582 A1 | 4/2013 | Kellerman |
| 2013/0219256 A1 | 8/2013 | Lloyd |
| 2013/0227397 A1 | 8/2013 | Tvorun |
| 2013/0263264 A1 | 10/2013 | Klein |
| 2013/0273882 A1 | 10/2013 | Walsh |
| 2013/0340043 A1 | 12/2013 | Zarei |
| 2014/0040051 A1 | 2/2014 | Ovick |
| 2014/0040787 A1 | 2/2014 | Mills |
| 2014/0096194 A1 | 4/2014 | Bhogavilli |
| 2014/0208198 A1 | 7/2014 | Ayoub |
| 2014/0250524 A1* | 9/2014 | Meyers ................ G06F 21/554 726/22 |
| 2014/0250538 A1* | 9/2014 | Rapaport ................ G06F 21/31 726/28 |
| 2014/0282872 A1 | 9/2014 | Hansen |
| 2014/0298469 A1 | 10/2014 | Marion |
| 2014/0304816 A1 | 10/2014 | Klein |
| 2014/0310392 A1 | 10/2014 | Ho |
| 2015/0058992 A1 | 2/2015 | El-Moussa |
| 2015/0067031 A1 | 3/2015 | Acharya |
| 2015/0067866 A1 | 3/2015 | Ibatullin |
| 2015/0112892 A1* | 4/2015 | Kaminsky ................ G06N 7/00 706/11 |
| 2015/0256556 A1 | 9/2015 | Kaminsky |
| 2015/0262183 A1 | 9/2015 | Gervais |
| 2015/0278491 A1 | 10/2015 | Horning |
| 2015/0358338 A1 | 12/2015 | Zeitlin |
| 2015/0379266 A1 | 12/2015 | McLaughlin |
| 2016/0005029 A1 | 1/2016 | Ivey |
| 2016/0119344 A1 | 4/2016 | Freitas Fortuna dos Santos |
| 2016/0342793 A1 | 11/2016 | Hidayat |
| 2016/0344769 A1 | 11/2016 | Li |

(56) References Cited

U.S. PATENT DOCUMENTS

| | | |
|---|---|---|
| 2017/0012960 A1 | 1/2017 | Idika |
| 2017/0013012 A1 | 1/2017 | Hansen |
| 2017/0048260 A1 | 2/2017 | Peddemors |
| 2017/0201540 A1 | 7/2017 | Call |
| 2017/0235954 A1 | 8/2017 | Kurupati |
| 2017/0237766 A1 | 8/2017 | Mattson |
| 2017/0257385 A1 | 9/2017 | Overson |
| 2017/0293748 A1 | 10/2017 | Kurupati |
| 2018/0041527 A1 | 2/2018 | Call |

FOREIGN PATENT DOCUMENTS

| | | |
|---|---|---|
| WO | WO2000/72119 | 11/2000 |
| WO | WO2002/093369 | 11/2002 |
| WO | WO2008/095018 | 8/2008 |
| WO | WO2008/095031 | 8/2008 |
| WO | WO2008/130946 | 10/2008 |
| WO | WO 2017/007705 | 1/2017 |
| WO | WO 2017/007936 | 1/2017 |
| WO | WO 2017/074622 | 5/2017 |

OTHER PUBLICATIONS

CTNF, dated Jan. 10, 2018, re: Bei Zhang, U.S. Appl. No. 14/859,084, filed Sep. 18, 2015.

NOA, dated Jan. 25, 2018, re: Zhiwei Li, U.S. Appl. No. 14/718,736, filed May 21, 2015.

CTNF, dated Feb. 8, 2018, re: Xiaoming Zhou, U.S. Appl. No. 15/651,303, filed Jul. 17, 2017.

CTNF, dated Mar. 5, 2018, re: Justin D. Call, U.S. Appl. No. 15/785,309, filed Oct. 16, 2017.

DuPaul, Neil, "Common Malware Types: Cybersecurity 101", Veracode, Oct. 12, 2012, 9 pages, Oct. 12, 2012.

Friendly Bit, "Rendering a web page—step by step", published Jan. 11, 2010, pp. 1-2, Jan. 11, 2010.

"Custom Elements: defining new elements in HTML", Dec. 8, 2013, 15 pages, Dec. 8, 2013.

NOA, dated Feb. 16, 2017, re: Justin D. Call, U.S. Appl. No. 14/822,287, filed Aug. 10, 2015.

NOA, dated Mar. 2, 2017, re: Justin D. Call, U.S. Appl. No. 14/930,198, filed Nov. 2, 2015.

NOA, dated Mar. 10, 2017, re: Roger S. Hoover, U.S. Appl. No. 14/470,082, filed Aug. 27, 2014.

CTNF, dated Mar. 9, 2017, re: Siying Yang, U.S. Appl. No. 14/925,547, filed Oct. 28, 2015.

NOA, dated Apr. 23, 2015, re: Justin Call, U.S. Appl. No. 13/527,025, filed Jun. 29, 2012.

CTFR, dated Feb. 10, 2015, re: Justin Call, U.S. Appl. No. 13/527,025, filed Jun. 19, 2012.

CTNF, dated Nov. 2, 2012, re: Justin Call, U.S. Appl. No. 13/527,025, filed Jun. 19, 2012.

CTFR, dated Apr. 23, 2013, re: Justin Call, U.S. Appl. No. 13/527,025, filed Jun. 19, 2012.

CTNF, dated Aug. 4, 2014, re: Justin Call, U.S. Appl. No. 13/527,025, filed Jun. 19, 2012.

NOA, dated Jun. 1, 2015, re: Justin Call, U.S. Appl. No. 13/527,025, filed Jun. 19, 2012.

CTNF, dated Feb. 26, 2015, re: Justin Call, U.S. Appl. No. 14/055,576, filed Oct. 16, 2013.

NOA, dated Aug. 21, 2015, re: Justin Call, U.S. Appl. No. 14/055,576, filed Oct. 16, 2013.

CTNF, dated Dec. 24, 2014, re: Justin Call, U.S. Appl. No. 14/055,583, filed Oct. 16, 2013.

NOA, dated Jun. 19, 2015, re: Justin Call, U.S. Appl. No. 14/055,583, filed Oct. 16, 2013.

CTNF, dated Dec. 24, 2013, re: Justin Call, U.S. Appl. No. 14/055,646, filed Oct. 16, 2013.

CTFR, dated May 27, 2014, re: Justin Call, U.S. Appl. No. 14/055,646, filed Oct. 16, 2013.

NOA, dated Aug. 12, 2014, re: Justin Call, U.S. Appl. No. 14/055,646, filed Oct. 16, 2013.

NOA, dated Sep. 4, 2014, re: Justin Call, U.S. Appl. No. 14/055,646, filed Oct. 16, 2013.

CTFR, dated Apr. 9, 2015, re: Justin Call, U.S. Appl. No. 14/055,704, filed Oct. 16, 2013.

CTNF, dated Dec. 4, 2014, re: Justin Call, U.S. Appl. No. 14/055,704, filed Oct. 16, 2013.

CTNF, dated Dec. 30, 2013, re: Justin Call, U.S. Appl. No. 14/055,704, filed Oct. 16, 2013.

CTFR, dated Apr. 22, 2014, re: Justin Call, U.S. Appl. No. 14/055,704, filed Oct. 16, 2013.

CTFR, dated Sep. 25, 2015, re: Marc Hansen, U.S. Appl. No. 14/055,714, filed Oct. 16, 2013.

CTNF, dated Mar. 16, 2015, re: Marc Hansen, U.S. Appl. No. 14/055,714, filed Oct. 16, 2013.

NOA, dated Jan. 13, 2016, re: Marc Hansen, U.S. Appl. No. 14/055,714, filed Oct. 16, 2013.

CTNF, dated May 20, 2015, re: Justin Call, U.S. Appl. No. 14/110,659, filed Oct. 8, 2013.

NOA, dated Aug. 19, 2015, re: Daniel Moen, U.S. Appl. No. 14/160,107, filed Jan. 21, 2014.

CTNF, dated Jun. 27, 2014, re: Justin Call, U.S. Appl. No. 14/255,248, filed Apr. 17, 2014.

NOA, dated Nov. 19, 2014, re: Justin Call, U.S. Appl. No. 14/255,248, filed Apr. 17, 2014.

NOA, dated Dec. 24, 2014, re: Justin Call, U.S. Appl. No. 14/255,248, filed Apr. 17, 2014.

CTNF, dated Sep. 1, 2015, re: Ariya Hidayat, U.S. Appl. No. 14/293,895, filed Jun. 2, 2014.

NOA, dated Mar. 30, 2016, re: Ariya Hidayat, U.S. Appl. No. 14/293,895, filed Jun. 2, 2014.

CTNF, dated Jun. 24, 2016, re: Roger Hoover, U.S. Appl. No. 14/470,082, filed Aug. 27, 2014.

CTNF, dated Aug. 28, 2015, re: Roger Hoover, U.S. Appl. No. 14/470,082, filed Aug. 27, 2014.

NOA, dated Jul. 21, 2016, re: Siying Yang, U.S. Appl. No. 14/541,062, filed Nov. 13, 2014.

CTNF, dated Feb. 23, 2016, re: Siying Yang, U.S. Appl. No. 14/541,062, filed Nov. 13, 2014.

CTNF, dated May 8, 2015 re: Timothy Peacock, U.S. Appl. No. 14/570,632, filed Dec. 15, 2014.

NOA, dated Dec. 18, 2015, re: Timothy Peacock, U.S. Appl. No. 14/570,632, filed Dec. 15, 2014.

CTNF, dated Mar. 17, 2016, re: Justin Call, U.S. Appl. No. 14/672,879, filed Mar. 30, 2015.

CTNF, dated Nov. 10, 2016, re: Nwokedi Idika, U.S. Appl. No. 14/728,621, filed Jun. 2, 2015.

CTNF, dated Jul. 18, 2016, re: Justin Call, U.S. Appl. No. 14/822,287, filed Aug. 10, 2015.

CTNF, dated Mar. 14, 2016, re: Justin Call, U.S. Appl. No. 14/874,717, filed Oct. 5, 2015.

NOA, dated Apr. 28, 2016, re: Justin Call, U.S. Appl. No. 14/874,717, filed Oct. 5, 2015.

NOA, dated Nov. 9, 2016, re: Justin Call, U.S. Appl. No. 14/930,198, filed Nov. 2, 2015.

CTNF, dated Jul. 21, 2016, re: Justin Call, U.S. Appl. No. 14/930,198, filed Nov. 2, 2015.

NOA, dated Nov. 16, 2016, re: Justin Call, U.S. Appl. No. 14/980,409, filed Dec. 28, 2015.

CTNF, Aug. 2, 2016, re: Justin Call, U.S. Appl. No. 14/980,409, filed on Dec. 28, 2015.

CTNF, dated Dec. 16, 2016, re: Marc Hansen, U.S. Appl. No. 15/148,139, filed May 6, 2016.

CTFR, dated Nov. 18, 2016, re: Justin D. Call, U.S. Appl. No. 14/672,879, filed Mar. 30, 2015.

CTNF, dated Jun. 1, 2017, re: Siying Yang, U.S. Appl. No. 14/942,769, filed Nov. 16, 2015.

NOA, dated Jun. 7, 2017, re: Call, et al., U.S. Appl. No. 14/930,198, filed Jun. 7, 2017.

CTNF, dated Jun. 2, 2017, re: Ariya Hidayat, U.S. Appl. No. 15/224,978, filed Aug. 1, 2016.

(56) References Cited

OTHER PUBLICATIONS

CTNF, dated Apr. 7, 2017, re: Yao Zhao, U.S. Appl. No. 14/861,906, filed Sep. 22, 2015.
CTNF, dated May 25, 2017, re: Daniel G. Moen, U.S. Appl. No. 14/980,231, filed Dec. 28, 2015.
NOA, dated Jun. 20, 2017, re: Roger S. Hoover , U.S. Appl. No. 14/470,082, filed Aug. 27, 2014.
CTNF, dated Jul. 26, 2017, re: Bei Zhang, U.S. Appl. No. 14/859,084, filed Sep. 18, 2015.
CTNF, dated Jun. 21, 2017, re: Zhiwei Li, U.S. Appl. No. 14/718,736, filed May 21, 2015.
CTFR, dated Aug. 14, 2017, re: Marc R. Hansen, U.S. Appl. No. 15/148,139, filed Mar. 6, 2016.
CTNF, dated Aug. 30, 2017, re: Justin D. Call, U.S. Appl. No. 15/470,715, filed Mar. 27, 2017.
CTFR, dated Sep. 5, 2017, re: Siying Yang, U.S. Appl. No. 14/925,547, filed Oct. 28, 2015.
NOA, dated Oct. 11, 2017, re: James D. Call, U.S. Appl. No. 14/822,287, filed Aug. 10, 2015.
NOA, dated Oct. 18, 2017, re: Roger 8. Hoover, U.S. Appl. No. 14/470,082, filed Aug. 27, 2014.
CTNF, dated Oct. 19, 2017, re: Jarrod S. Overson, U.S. Appl. No. 15/059,080, filed Mar. 2, 2016.
CTNF, dated Oct. 19, 2017, re: Wesley Hales, U.S. Appl. No. 15/011,237, filed Jan. 29, 2016.
NOA, dated Oct. 25, 2017, re: Michael J. Ficarra, U.S. Appl. No. 15/060,322, filed Mar. 3, 2016.
CTNF, dated Nov. 13, 2017, re: Nwokedi Idika, U.S. Appl. No. 14/728,596, filed Jun. 2, 2015.
CTNF, dated Dec. 13, 2017, re: Justin D. Call, U.S. Appl. No. 15/645,787, filed Jul. 10, 2017.
NOA, dated Dec. 18, 2017, re: Yao Zhao, U.S. Appl. No. 14/861,906, filed Sep. 22, 2015.
NOA, dated Jan. 5, 2018, re: Yao Zhao, U.S. Appl. No. 14/861,906, filed Sep. 22, 2015.
NOA, dated Jan. 9, 2018, re: Justin D. Call, U.S. Appl. No. 15/470,715, filed Mar. 27, 2017.
NOA, dated Jan. 16, 2018, re: Justin D. Call, U.S. Appl. No. 14/822,287, filed Aug. 10, 2015.
CTFR, dated Jan. 25, 2018, re: King, John 8., U.S. Appl. No. 14/942,769, filed Nov. 16, 2015.
Detection and Analysis of Drive-by-Download Attacks and Malicious JavaScript Code, Apr. 26, 2010.
Defending Browsers against Drive-by Downloads: Mitigating Heap-spraying Code Injection Attacks, Jul. 9, 2009.
Intrusion Detection using Sequences of System calls, Aug. 18, 1998.
Detecting and Preventing Drive-By Download Attack via Participative Monitoring of the Web, Jul. 23, 2013.
Recent Java exploitation trends and malware, Jul. 26, 2012.
DoDOM: Leveraging DOM Invariants for Web 2.0 Application Robustness Testing, Nov. 1, 2010.
Cujo: Efficient Detection and Prevention of Drive-by-Download Attacks, Dec. 6, 2010.
Design and Implementation of a Distributed Virtual Machine for Networked Computers, 1999.
International Search Report, dated Jan. 21, 2015, PCT/US14/23635.
Examination Report No. 1 for Standard Patent Application, App. No. 2014237025, Justin D Call, dated Sep. 25, 2014.
International Search Report, dated Sep. 22, 2016, PCT/US16/40645.
International Search Report, dated Feb. 16, 2017, PCT/US16/53472.
International Search Report, dated Oct. 11, 2016, PCT/US16/41337.
International Search Report, dated Jul. 1, 2016, PCT/US16/25092.
International Search Report, dated Aug. 14, 2014, PCT/US14/27805.
International Search Report, dated Aug. 1, 2014, PCT/US14/24232.
International Search Report, dated Jul. 18, 2014, PCT/US14/23897.
International Search Report, dated Jun. 3, 2013, PCT/US13/26516.
CTNF, dated Jun. 29, 2018, re: Timothy Dylan Peacock, U.S. Appl. No. 15/137,824, filed Apr. 25, 2016.
CTFR, dated Feb. 23, 2018, re: Wesley Hayes, U.S. Appl. No. 15/011,237, filed Jan. 29, 2016.
CTNF, dated Mar. 30, 2018, re: Michael J. Ficarra, U.S. Appl. No. 15/060,380, filed Mar. 3, 2016.
CTNF, dated May 3, 2018, re: Marc R. Hansen, U.S. Appl. No. 15/148,139, filed May 6, 2016.
CTNF, dated Apr. 19, 2018, re: Michael J. Ficarra, U.S. Appl. No. 15/919,034, filed Mar. 12, 2018.
NOA, dated Apr. 30, 2018, re: Xiaoming Zhou, U.S. Appl. No. 15/651,303, filed Jul. 27, 2017.
CTNF, dated May 15, 2018, re: Marc R. Hansen, U.S. Appl. No. 15/202,755, filed Jul. 6, 2016.
CTFR, dated May 10, 2018, re: Nwokedi Idika, U.S. Appl. No. 14/728,596, filed Jun. 2, 2015.
CTNF, dated Feb. 16, 2018, re: Siying Yang, U.S. Appl. No. 15/068,468, filed Mar. 11, 2016.
NOA, dated May 18, 2018, re: Siying Yang, U.S. Appl. No. 14/942,769, filed Nov. 16, 2015.
CTNF, dated May 23, 2018, re: Bei Zhang, U.S. Appl. No. 14/859,084, filed Sep. 18, 2015.
CTFR, dated May 17, 2018, re: Jarrod S. Overson, U.S. Appl. No. 15/059,080, filed Mar. 2, 2016.
NOA, dated May 14, 2018, re: Xiaoming Zhou, U.S. Appl. No. 15/651,303, filed Jul. 17, 2017.
CTNF,dated Jun. 7, 2018, re: Siying Yang, U.S. Appl. No. 14/925,547, filed Oct. 28, 2015.
NOA, dated Oct. 24, 2018, re: Marc R. Hansen, U.S. Appl. No. 15/148,139, filed May 6, 2016.
CTFR, mailed on Sep. 11, 2018, re: Michael J. Ficarra, U.S. Appl. No. 15/060,380, filed Mar. 3, 2016.
CTFR, mailed on Nov. 1, 2018, re: Marc. R. Hansen, U.S. Appl. No. 15/202,755, filed Jul. 6, 2016.

\* cited by examiner

DETECTING ATTACKS AGAINST A SERVER COMPUTER BASED ON CHARACTERIZING USER INTERACTIONS WITH THE CLIENT COMPUTING DEVICE

BENEFIT CLAIM

This application claims the benefit under 35 U.S.C. 120 of application Ser. No. 14/672,879, filed Mar. 30, 2015, which claims the benefit of application Ser. No. 14/255,248, filed Apr. 17, 2014, now U.S. Pat. No. 8,997,226, the entire contents of which are hereby incorporated by reference for all purposes as if fully set forth herein. Applicants hereby rescind any disclaimer of subject matter in the priority application(s) and advise the Office that the claims of this application may be broader than others previously granted from the same disclosure.

TECHNICAL FIELD

This document relates to systems and techniques for identifying that malicious software is operating on one or more computing devices, as a mechanism to improving computer system security.

BACKGROUND

Research indicates that a large share of web traffic involves computer bots—many are malware. Bot activities include content scraping, reconnaissance, credential stuffing, creating fake accounts, comment spamming, and similar activities. Bots can impose an unnecessary load on any company trying to serve web content efficiently. More importantly, they can attempt to "learn" the operation of a web site so as to exploit it. As one example, malicious software (malware) may execute a "man in the browser" attack by intercepting communications that a user makes with a web site in a manner that makes the user believe that he or she is actually communicating with the web site. For example, malware may generate a display for a user who is visiting a banking site, where the display requests from the user information such as social security number, credit card number, other account numbers. An organization that operates the malware may then have such data sent to it, and may use the data to steal from the user, the web site operator, or both.

SUMMARY

This document discusses systems and techniques by which interaction by bots (such as malware) with web site content can be identified. For example, a vendor of web security services and products may provide a merchant, bank, or other web site operator with injectable code, and the latter may add such code to web code that the web site operator serves to client computing devices that request its web page or pages (e.g., by actually incorporating the injectable code into a served HTML file). The injected code may cause characterization data to be collected at the client computing devices, such as data that indicates the configuration of a particular device (e.g., make of web browser, version of browser, resolution of device, operating system that is running, etc.) and information about interaction by a user (whether real or simulated) with the device (e.g., mouse movement and clicking patterns, keystroke values and patterns, and form submission activity on web pages).

The individual client devices may then report the characterization data to the vendor of web security services, which may analyze the data to determine whether each of particular devices was likely operated by an actual human or was instead simulating human activity and was under control of a bot, whether benign or malicious. Such analysis may include the identification of definitive artifacts of non-human interaction, meaning that the data shows activity that is impossible for a human to perform in a normal manner on a typical device (e.g., form submissions that occurred without keystrokes or voice input, user agent strings that do not match analyzed characteristics of a device, and the like).

From such analysis, the vendor of web security services may produce a characterization of the each client computing device to which its customer has served code over the Internet. Such characterization may, for example, involve classifying the client computing devices into groups of (a) legitimate devices, (b) malicious devices or benign devices that exhibit malicious behavior, and (c) uncharacterized devices whose status as legitimate or malicious cannot be determined with sufficient certainty. The number of devices in each such category may then be determined, and a representation may be made to indicate such number, such as a graph depicting each of the three types of devices.

Subsequently, the vendor of web security services may make available to its customer or potential customer software, devices, or a combination of the two that is capable of rewriting code served by the customer to client computing devices. For example, such provided software or hardware may obfuscate (e.g., via randomization) the code in manners that do not change the appearance and operation of the code as viewed by a user of a client device. In addition, such software or hardware may obfuscate (e.g., via randomization) the code in a different manner each time the code is served, so as to prevent malicious software from identifying how the code is being obfuscated, which may be termed as providing polymorphic code. Such code may also be provided with injectable code that reports data back to the vendor of web security services in a manner similar to that performed before the software and hardware was provided. Upon receiving such data, the vendor may again make classification decisions about each of the various client computing devices, may total up the number of devices in each class, and may add such information to a report in electronic form that may be provided to the client. Thus, the customer may obtain a report that shows before and after levels of bot activity among the client devices that the customer serves, and may receive an objective view of the benefits of deploying the software and hardware that the vendor of web security service has provided.

The characterization of client devices may also be used by the vendor of security services in order to improve its tools for obfuscating the operation of the code served by its customers, actual or potential. For example, a vendor may check for the presence of non-human actors in a population of client devices both before and after a particular countermeasure (e.g., obfuscation via randomization applied in different manners to different content requests) has been applied to the code being served, where the countermeasure is served to a relatively small portion of the population of client devices served by the vendor or its customers. The ability of the countermeasure to interfere with the non-human actors at the clients can be identified, and a determination can be made whether to deploy the countermeasure more broadly, based at least in part on an identified ability of the countermeasure to interfere with such non-human actors (where the countermeasure would be broadly deployed if it were determined to have a substantial reduction in interaction by non-human actors). Such before/after testing can be performed on a wide range of different countermeasures, and a blend of countermeasures determined to have been successful may subsequently be rolled out more broadly across the customers of the security vendor.

In certain implementations, such systems and techniques may provide one or more advantages. For example, a web security vendor can objectively and accurately determine, and represent to a customer, the level of bot or malware risk in the population of computers the customer serves, and can also demonstrate objectively the changes in such activity from implementing services offered by the security vendor. In addition, the security vendor can collect characterization data across many different users and different forms of served code when it can provide such a service to multiple customers and potential customers, and thus can learn more about malicious activity in a population of client devices. In particular, intelligent deductions about malicious activity might be possible only when multiple parameters are analyzed in combination, and across a larger and more diverse set of client devices (e.g., the recipients of code from multiple different organizations serving different styles of web pages), along with a more diverse base of served code, can better permit such analysis. With such improved analysis, the security vendor can identify typical attacks by malicious software and can instrument countermeasures into its security products, such as by adding code to that served by its customers of the form: "If event handler A on a device has property X for an event, then drop the event." The vendor may also test the countermeasures to determine which are the most effective.

In one implementation, a computer-implemented method is disclosed that comprises providing, for use by a third-party, injectable computer code that is capable of being served with other code provided by the third-party to client computing devices; receiving data from client computing devices that have been served the code by the third-party, the data including data that characterizes (a) the client computing devices and (b) user interaction with the client computing devices; classifying the client computing devices as controlled by actual users or instead by automated software based on analysis of the received data from the client computing devices; and providing to the third party one or more reports that characterize an overall level of automated software activity among client computing devices that have been served code by the third party. The injectable code can be served from a domain that matches a domain to which the client computing devices transmit the data that characterizes the client computing devices and the user interaction with the client computing devices. Also, the injectable code can be served by a system operated by the third-party and the data that characterizes the client computing devices and the user interaction with the client computing devices is submitted by the client computing devices to an organization that provided the injectable computer code for use by the third-party.

In certain aspects, the data that characterizes the client computing devices comprises data obtained from document object models created on respective ones of the client computing devices from execution of code served to the respective ones of the client computing devices by the third-party. Moreover, the data that characterizes user interaction with the client computing devices can comprise mouse and keystroke events. That data that characterizes user interaction with the client computing devices can also be generated using code that hooks onto mouse and keystroke handlers for the client computing devices. Also, the data can comprise form submission activity for one or more web forms served to the client computing devices by the third-party.

In yet other aspects, the method further comprises providing the third-party with a mechanism for obfuscating code served by the third-party to the client computing devices; receiving data from client computing devices that have been served the code by the third-party using the mechanism for obfuscating code; and classifying the client computing devices that have been served the code by the third-party using the mechanism for obfuscating code, as being controlled by actual users or instead by automated software based on analysis of the received data from the client computing devices, wherein at least one of the one or more reports provided to the third-party compare automated software activity among the client computing devices from before the mechanism for obfuscating code was provided to the third-party to automated software activity among the client computing devices from after the mechanism for obfuscating code was provided to the third-party. Moreover, a first subset of the received data can be provided by client computing devices that have been served original code from the third party; and a second subset of the received data can be provided by client computing devices that have been served code from the third party that has been obfuscated by altering original code from the third in a different manner for each serving of the original code from the third party, the altering in a different manner for each serving interfering with an ability of malware to identify a manner in which the code from the third party operates. In addition, classifying the client computing devices can comprise identifying actions that definitely indicate an absence of a human user in performance of the actions.

In another implementation, a computer-implemented system is disclosed that comprises a first computer system storing copies of injectable code for provision to third-parties that do not operate the first computer system; one or more second computer systems comprising web server systems operated by the third-parties and programmed to serve the injectable code with code produced by respective ones of the one or more third-parties; an activity analyzer subsystem executed by one or more servers that are operated in coordination with the first computer system, and arranged to receive activity data from injectable code served by the one or more second computer systems and to analyze the activity data to determine whether particular ones of clients executing the injectable code are operated by humans or by computer bots; and a report generator associated with the first computer system and arranged to generate electronic reports for provision to the third-parties indicating levels of bot activity in clients served by respective ones of the third-parties. The injectable code can be served from a domain that matches a domain to which the injectable code causes the clients to transmit the activity data, and the activity data can comprise data obtained from document object models created on respective ones of the clients from execution of code served to respective ones of the clients by the third-party, and data that characterizes mouse and keystroke events. The activity data can be generated using code that hooks onto mouse and keystroke handlers for the clients, and the system can be programmed to identify definitive indications of an absence of a human user in performance of a defined action.

In some aspects, the activity data comprises form submission activity for one or more web forms served to the clients by the third-party. The system may also include a sub-system arranged to cooperate with the first computer system to provide the third-party with a mechanism for obfuscating code served by the third-party to the clients; receive data from clients that have been served the code by the third-party using the mechanism for obfuscating code; and classifying the clients that have been served the code by the third-party using the mechanism for obfuscating code, as being controlled by actual users or instead by automated software, based on analysis of the received data from the clients, wherein at least one of the electronic reports for provision to the third-party compares automated software activity among the clients from before the mechanism for obfuscating code was provided to the third-party, to automated software activity among the clients from after the mechanism for obfuscating code was provided to the third-party.

In yet another implementation, one or more tangible, non-transient computer-readable devices are disclosed that have stored thereon instructions, that when executed by one or more processors, perform certain actions. The actions may include providing, for use by a third-party, injectable computer code that is capable of being served with other code provided by the third-party to client computing devices; receiving data from client computing devices that have been served the code by the third-party, the data including data that characterizes (a) the client computing devices and (b) user interaction with the client computing devices; classifying the client computing devices as controlled by actual users or instead by automated software based on analysis of the received data from the client computing devices; and providing to the third party one or more reports that characterize an overall level of automated software activity among client computing devices that have been served code by the third party. The injectable code can be served by a system operated by the third-party and the data that characterizes the client computing devices and the user interaction with the client computing devices is submitted by the client computing devices to an organization that provided the injectable computer code for use by the third-party. Also, the the data that characterizes user interaction with the client computing devices can comprise form submission activity for one or more web forms served to the client computing devices by the third-party.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

This document describes systems and techniques for identifying client computing devices in a population of devices that may be operated by malicious automatic software or non-malicious automatic software (bots), in distinction to devices that are operated by actual human users. Upon making such identification, an organization may present such information to a company that serves web code to such devices, so as to demonstrate the level of prevalence of bots in the population of devices. Such a providing organization may also provide services to interfere with the operation of bots, and in particular malicious bots, and may further gather data upon providing such services, so as to objectively demonstrate that the services reduce the ability of malicious software to interact with a customer's served code and to attempt to attack the company and its users. The analysis of bot activity with and without countermeasure features provided with code that is served, may also be used to test the effectiveness of the countermeasure features, so as to select particular countermeasure features to deploy on behalf of most or all web traffic for a customer, or across multiple customers.

Figure 1:
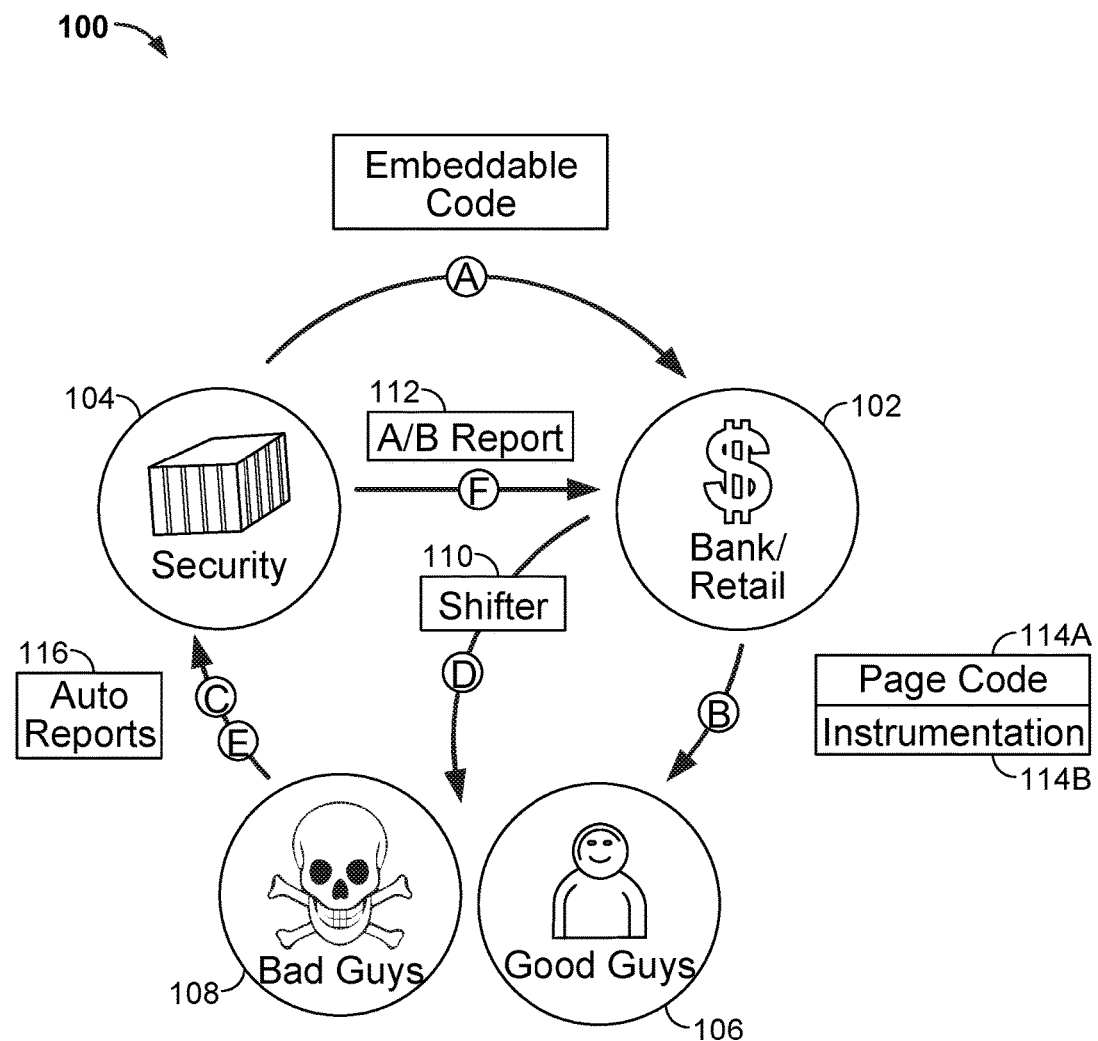
FIG. 1 is a conceptual diagram of a system for reporting presence of malicious software.

FIG. 1 is a conceptual diagram of a system for reporting presence of malicious software. In general, the system 100 includes a security services company 104 that provides or wishes to provide security services to a web content provider 102, such as a bank or retailer. The types of web content providers are very diverse, as is the type of code they provide to their users. Typically, the code includes some hypertext mark-up language (HTML) variant that is further defined by cascading style sheets (CSS) and has additional functionality provided by JavaScript that may be pointed to by the other code and that may be gathered and executed on a browser of a client device that has loaded the other code from the web content provider. The various types of code that are loaded may come from a single provider 102, or that provider 102 may serve some of the code, which may then call the rest of the code to the browser when it is rendered, where the other code can also be served by the provider 102 or can be served by one or more third parties.

The web content is served to a plurality of users (via their computing clients) who request content from the web content provider 102, where the users are shown here in the form of good guys 106 and bad guys 108. Good guys 106 are generally human individuals who wish to receive content from the web content provider 102 and to interact with the served web content. Such good guys 106 are typical of good people who are "surfing" the web, perhaps relatively randomly, or with a specific purpose in mind, such as to perform on-line banking, to purchase items from an on-line store, to access streaming media, and the like. Bad guys 108 are generally computers that may have been programmed by illegitimate entities to operate automatically (bots) so as to exploit computer server systems in ways that will benefit such organization, and may frequently be referred to, when multiple devices are acting in coordination, as a botnet. Other sorts of users may also exist, such that human users are not necessarily good guys 106, and bots are not automatically bad guys 108. For example, legitimate organizations operate web crawling software that acts as a bot and is used to identify content at web sites so as to index such content, such as for use with a search engine. As described below, particular classification mechanisms are used and different users are said to be classified into particular categories, but in actual operation the categorization may fall on multiple dimensions in addition to those discussed here, where the main focus is on the dimensions of human vs. bot and benign vs. malicious.

An example process flow is indicated in the figure by lettered arrows. As a first step in the process flow, security service provider 104 provides embeddable or injectable code to web content provider 102. Such code may take the form of HTML code, JavaScript code, or other code that points to operational code that can be accessed upon the execution of code that is provided by the web content provider 102 to one or more web browsers or other applications (e.g., a URL that points to JavaScript). The web content provider 102 may then add the injectable code that it has received, as indicated by arrow A, to other HTML, JavaScript, or other code that it serves as part of its ordinary operation. In the example of a retailer, then, the web content provider may normally serve code for displaying, to users who access a web site, items that are for sale, along with code for processing an order, such as code for receiving credit card numbers from users who are ordering products.

Such a web content provider 102 may be concerned that certain of its users are actually bots or other malware that perform "man in the browser" attacks against legitimate users hoping to purchase products from the web content provider 102. Such malware may generate a pop-up box to accept credit card information from a user in a manner that makes the user believe that the pop-up box has been provided by the web content provider 102. The malware may instead intercept credit card information and forward it to a malicious organization that provided the malware, without the user knowing that it gave such information away. In other situations, the malware may operate automatically so as to artificially add a load to a server system for the web content provider (e.g., in a denial of service attack or similar attack), to perform various automated operations with the web content provider's web code to determine how such web code operates so as to permit development of software that enables a man in the browser attack, or for other such illicit purposes that the web content provider 102 would like to identify and eradicate.

As a result, and in an attempt to identify such activity, the injectable code may be programmed to operate on each client computing device to which it is served in a manner that collects data for distinguishing operation of a client computer by a human user as compared to operation by a programmatic (bot) user. Particular mechanisms for making such a determination are described in detail below.

As shown by arrow B, the web content provider 102 serves both web page code 114A and instrumentation code 114B, to different client computing devices that make requests of the web content provider's 102 web server system. The web page code 114A is the normal code that the web content provider 102 would normally serve to carry out interaction with the user of a client device. The instrumentation code 114B supplements the normal code and is used to analyze operation of the device on which the web page code 114A is executed. The instrumentation code 114B in this example may include the provided injectable code, either as it was provided by the security service company 104 or in a derived format (e.g., if the web content provider 102 needs to make modification to the injectable code in order to prevent it from breaking the web page code 114A). Other parts of the instrumentation code 114B may perform actions in addition to those needed for the security services company 104 to identify the likely presence of bots that are operating certain ones of the computing devices as bad guys 108. For example, those other parts of the instrumentation code 114B may perform analysis used to improve the efficiency with which web code served to the client operates, to perform additional analysis to identify the presence of malicious software over and above what the security service company 104 needs in order to tabulate the presence of legitimate and illegitimate users, and other operations.

Arrow C shows automatic reports 116 being returned from client devices belonging to bad guys 108 and good guys 106, where the reports 116 are returned to the security service company 104. Such reports 116 may contain data that characterizes the particular client devices that have been served code by the web content provider 102, and the operation of the particular client devices with the code. For characterizing a device itself, the data may be generated by the injectable code or other code analyzing a document object model (DOM) on a particular device and reporting back information from that DOM. Such analysis or other analysis may identify characteristics of the device (e.g., screen resolution, type and amount of memory, include peripherals, and make/model information), its operating system (brand, SKU (e.g., Windows Home as compared to Windows Professional), and version), and the web browser (e.g., brand, version, plug-ins). This and other such information may help to provide a form of "signature" for the device.

For characterizing the operation of the device by a user, other data may be provided, whether that user is an actual human or a piece of automatic software, such as a legitimate crawler or a form of malware such as a bot that is part of a botnet. Such additional information may be acquired, for example, by monitoring event handlers on the device and recording data from the event handlers. For example, the information may include data that identifies how a user has moved or clicked a mouse or similar pointer, and which keys, and at what rate, the user has pressed on a keyboard. In addition, the data may identify whether inputs were received by users gestures (e.g., certain motions of a mobile device or motions in front of a device captured by one or more cameras) and the form those gestures took. The information may also include data that indicates user interaction with forms on a web page displayed on a device, such as which fields on a form were selected, what information was entered into them, the speed with which each character and field was entered, and the order in which the fields were selected and filled. More particular information about the data collected by and reported from the client devices is discussed below.

Other data may be affirmatively inconsistent with a human-operated system, in a binary sort of way. For example, JavaScript code provided to a client may determine a configuration for the client, and if the user agent string reported by the client does not match the determined configuration, a strong inference can be made that software on the client is trying to hide the true nature of the client, likely for malicious purposes. Similarly, if a form is submitted by the client without the injected code seeing any keystrokes, mouse movements, or both (or voice input), another strong inference can be made that a non-human user is operating the device. Similarly, if a headless browser is identified as operating on a client device in a situation that such should not occur, again a strong inference may be made that a non-human operator is involved. For example, if such a headless browser uses PhantomJS, the injected code can analyze the client device to determine whether any phantom properties are defined on the device, even if the headless browser cannot otherwise be identified.

As shown by arrow D, a shifter 110 may be made available to the customer 102. The shifter 110 is a service, implemented as software, hardware, or both, and sold to the customer or provided in a form of subscription, that codes the customer's outgoing web code and associated code (e.g., HTML, CSS, and JavaScript) so as to change it from its normal form, resulting in an interference with the ability of malware to analyze the served code, and with a goal of determining a way to interfere with users' interaction with the code in the future.

Such provision of shifting may occur in parallel with the provision of injectable code, and different populations of clients may be tracked in the automatic reports 116 that are received—so that the security service provider 106 may keep track of activity by client devices that are subjected to shifting and those that are not. Alternatively, the customer 102 may serve code for a time period without the benefit of the shifter 110 and may then serve it for a time while using the shifter 110. In either approach, aggregated information across many client devices may be gathered for serving with and without the shifter 110, and statistics may be generated to show the presence of different types of users of the devices for use with and without the shifter 110.

Arrow E shows such reporting of data from the injectable code for the clients that were served code affected by the shifter 110. Such data may be directed to the same parameters as the data reported pursuant to arrow B, and may characterize both the devices themselves and the manner in which they were interacted with by users. The security services company 104 may then analyze such reported data in a manner the same or similar to its analysis of the data received pursuant to arrow B. The company 104 may then aggregate the data from devices served via the shifter 110 and also combine it with the aggregated data received form those devices not served through the shifter 110. Such aggregation may result in the generation of a comparison report that indicates bot activity with the shifter 110 against bot activity without the shifter 110.

Arrow F shows delivery of electronic information from the security service company 104 to the web content provider 102 indicating the comparison of bot activity before and after, or otherwise with and without, the shifter 110. For example, the information may take the form of an A/B, or before/after, report that shows graphically such information. One example presentation of such a report is discussed below with respect to FIG. 6.

Figure 2A:
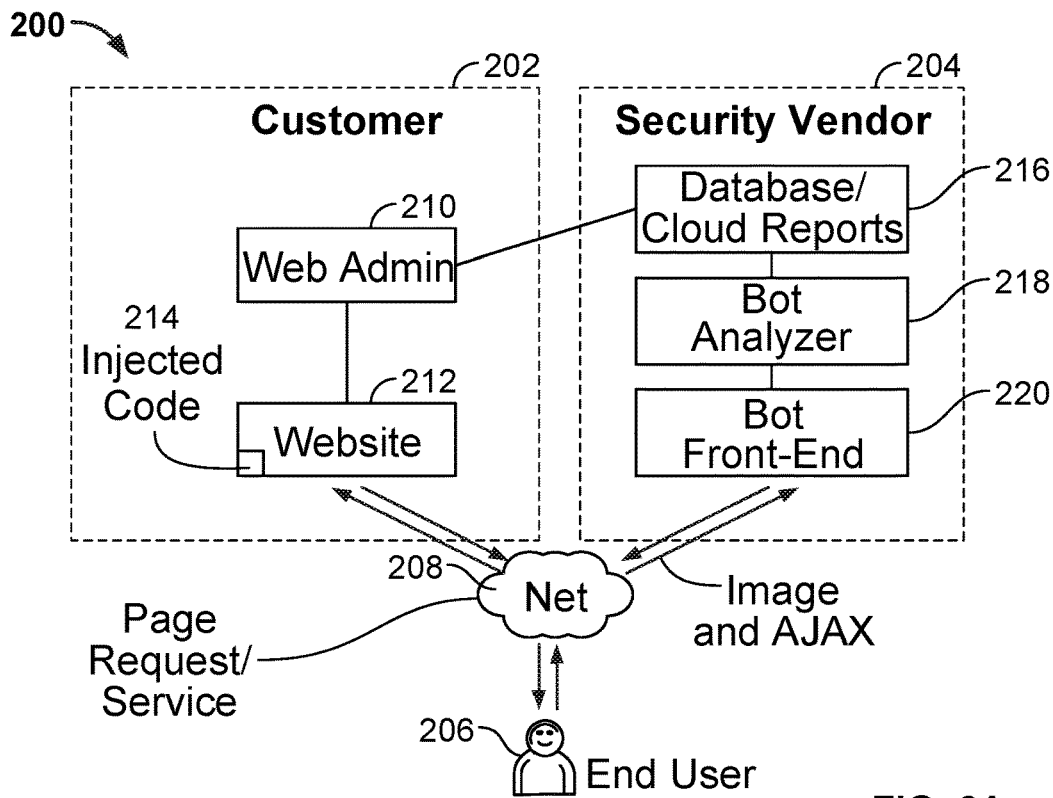
FIGS. 2A and 2B are schematic diagrams of systems for reporting presence of malicious software.
Figure 2B:
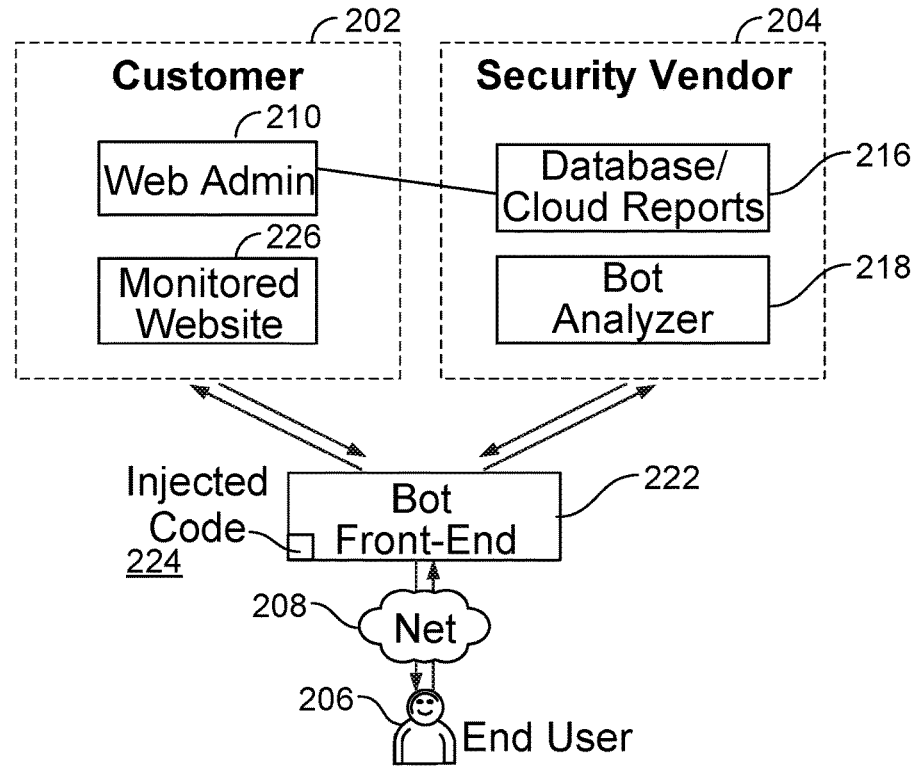

FIGS. 2A and 2B are schematic diagrams of systems 200, 230 for reporting presence of malicious software. In general, the systems 200, 230 provide alternative approaches for inserting injectable code that is to be served along with code from a web content provider, where the injectable code may have been provided by a third-party security vendor 204 that is separate from and independent of the web content provider, shown here as customer 202.

Referring now to system 200 in FIG. 2A, there is shown a security vendor 204 and customer 202 of the security vendor 204, which may be a present or prospective customer. The customer 202 may be, among other things, a provider of web content. For example, the customer 202 may host and serve a number of web pages from a number of different web sites. Typical such organizations include newspapers and other publishers, banks, and retailers. The customer 202 may serve a very large volume of web content, including thousands, hundreds of thousands, and millions of page views per day. Such content may be served to a number of different users, such as user 206, who are operating computers that send requests for content to the customer 202. User 206 may be a human user operating a computing device or a non-human user such as a crawler or malware automatically operating a client device. Malware may, in certain instances, take extensive efforts to obscure the fact that it is not a human user, such as by faking the presence of a web browser that a human user would employ.

In this example, a tapping system architecture 200 is shown. Here, the monitoring system operates in parallel with the web server system, and an operator of a web server system may add injectable code to the code the web server system would otherwise deliver. The injected code may then run automatically in the browser of a client and send collected information to the monitoring system via normal http requests and AJAX requests.

More specifically, customer 202 hosts a web site 212, which may be a variety of forms of web sites that are familiar to users of the World Wide Web. The web site 212 may be administered by a web administrator 210 operating an administration console or other form of hardware and software that permits the customer 202 to track performance of a server system that serves the web site 212. For example, the administrator 210 may identify a number of page loads for the web sites 212 and other information that is normal for monitoring and administering a web site.

The web site 212 is served, by web servers, along with injected code 214. The injected code 214 may take a variety of forms and may be integrated with or otherwise served with the code for the web site 212 to various client devices, such as a device of user 206. The injectable code 214 may be programmed to monitor activity on various client devices, such as activity that indicates a user interacting with the client device, including in the form of movement and selection by way of a pointer, movement in the form of gestures perform with or around the computing device (e.g., captured by cameras or motions sensors of the device), and text entry by a keyboard or other mechanism.

The web site 212 and injected code 214 are served through a network that may include portions of the Internet 208, in response to a page request from users such as user 206. The request may take a familiar form, such as an http request, and the serving may occur also according to familiar manners, such as the serving of HTML code, CSS code, and JavaScript code, among others. The injected code 214 in such an example may include the actual code that executes on the client device itself, or a URL or other mechanism that causes the client device of the end user 206 to load code for monitoring the operation of the client device. For example, the injected code 214 may cause the client device of user 206 to communicate with bot front end 220 that is hosted by the security vendor 204, and which may act as a web server hosted by the security vendor 204.

When the injected code 214 itself does not provide all needed monitoring services, the bot front end 220 may provide additional code for monitoring activity on the client device such as the activity discussed above. The injected code 214, or other code that is referenced by the injected code 214, may also report data back to the bot front end 220. For example, during the operation of the client device, the injected code 214 may identify particular parameters of the device, such as parameters relating to the hardware installed with the device, the operating system of the device, the browser of the device, plug-ins for the browser of the device, and other software on the device, among other things. The injected code 214 may also identify, for example, that text was typed into a web form for the web site 212 using particular characters, and may also identify the time at which each of the characters was entered. Similarly, it may collect data that shows that a form submission was made without any voice input or keyboard key presses. Such data may thus be transmitted to the bot front end 220 for analysis.

A bot analyzer 218 operated by the security vendor 204 may take the information obtained by the bot front end 220 and analyze it in an effort to identify whether user 206, and users of other client devices that have reported in the data after being served by customer 202, are human users or are nonhuman users. For example, the data that characterizes the client device itself may indicate that the device is not being operated by a normal human, such as if browser identification data does not match with data that is known to be appropriate for the particular browser that the device is reporting. Also, if characters were entered at a rate that does not correspond to human user typing rates (or no characters were entered at all before a form submission occurred), the client device may be indicated as being operated by a nonhuman user. Similarly, if motion of a pointing device is inconsistent with motion known to represent that of a human user, the client device for user 206 may be identified by the vendor 204 as being operated by a bot or nonhuman user. Such determinations may be made in various manners, including by determining whether the user interaction too closely matches interaction from other user sessions by other devices so as to indicate that the interaction is automated (by common bot software installed across those multiple devices) rather than human directed.

Such analysis may be conducted in a variety of manners. For example, profiles for different parameters that indicate human or nonhuman users may be generated in advance, and data from particular client devices may be compared against the profiles in a weighted manner so as to generate a score to indicate whether a particular client device is operated by a human or nonhuman user. For example, data that characterizes hardware on a device may be assigned a first score, while data that characterizes interaction with the device may be assigned a second score, and the two scores may be combined in a weighted manner, where the weights represent previously-determined relevance of each factor to a prediction, so as to generate a final score. For example, the final score may be set to fall in a range from 0 to 100, where lower scores indicate a higher likelihood of a nonhuman user, whereas higher scores indicate a higher likelihood of a human user. The contribution of device characterization to that score may be 30%, the contribution of user interaction may be 60%, and the contribution of form interaction behavior may be weighted 10%. However, if any of the factors shows clearly human or non-human activity, it can drive the decision and override any weighting.

Other mechanisms for generating a human or nonhuman determination may also be used. For example, various inputs reported by the injected code 214 may be provided to a machine learning system, where parameters have been gathered previously for devices that have previously been determined to be human or nonhuman users. The system may thus be trained on those prior users and their characterization data. Such a system may then generate parameters that it has determined to be correlated with human or nonhuman use, and may use such parameters to subsequently classify other machines as having human, nonhuman, or indeterminate users.

The bot analyzer 218 may provide information resulting from its analysis to a database/cloud reports module 216. Such module 216 may include hardware (e.g., memory and one or more processors) and software programmed to store information about the classification of individual client devices and aggregated information across multiple client devices, and to generate electronic reports that characterize such information in a conveniently viewable manner. For example, the module 216 may generate one or more electronic documents that, when viewed, display one or more graphs indicating levels of human and nonhuman representation among client devices that have been served by customer 202, or other customers of security vendor 204 that have been provided with injectable code 214. As shown by a line drawn between module 216 and web administrator 210, the module 216 may electronically transmit such reports to the web administrator 210 or to another user at customer 202 that may act on such reports. For example, a chief technology officer (CTO) or information technology (IT) administrator at the customer 202 may be provided with a report that contrasts bot activity before and after a countermeasure device or service has been provided to the customer 202.

Although not shown, such countermeasures may be made available to the customer 202 in a variety of manners. For example, security vendor 204 may provide customer 202 with a hardware box in the form of hardware preprogrammed with software that may serve as a security intermediary to be placed between the website 212 and the network 208 as described in more detail in FIG. 7 below. Such an intermediary may rewrite code that customer 202 serves for website 212, so as to obfuscate the operation of such code from malware that may be executing on client devices. Furthermore, such obfuscation may occur in a different manner for each of different servings of the code, so that a client device (or multiple coordinated client devices) making multiple requests in an attempt to analyze and then exploit the code, will be unsuccessful because its analysis will have been performed on code that no longer exists under the implementation of a device that generates many permutations of the code for the customer 202.

In other implementations, such countermeasures may be implemented through software that may be provided to the customer 202 and executed on the customer's own server system. In yet other cases, such countermeasures may be provided as software as a service (SaaS) through a cloud-based implementation. For example, the vendor 204 may host a cloud-based code rewriting service, may receive code to be served by customer 202 through a network 208 (and from many other customers also), and may rewrite code such code to be served before serving it directly to a client device that requested it, or passing the rewritten code back to customer 202 for serving of the code. Various mechanisms may be used in such an implementation to reduce any level of latency that may be introduced by having multiple passes of the code through the network 208.

Referring now to FIG. 2B, the security vendor 204, customer 202, and user 206 are again shown in a similar relationship. However, in this implementation, bot front end 222 is shown as being outside of security vendor 204 and customer 202. Such an implementation may occur where the vendor 204 is providing countermeasures to the customer 202, so that bot front end 222 may be implemented in the form of a hardware box running countermeasures software or as a web service. As such, bot front end 222 in this example is responsible not only for collecting data from client devices running the injected code 224, but also recoding served code that is received from the monitored website 224. In this implementation, the bot front end 222 can be operated by the customer 202 or the security vendor 204, or both in cooperation.

In particular implementations, the bot front end 222 may be deployed for the customer 202 and initially operated merely to collect data from the injectable code, but not initially to perform countermeasure actions. Such operation may allow the bot front end 222 to characterize the types of client devices that the customer 202 is seeing requesting its data and interacting with its web pages during normal operation. Subsequently, the bot front end 222 may turn on its countermeasures and continue collecting such data as discussed above and below. Again, such data may be analyzed by the bot analyzer 218 and provided to the database/cloud reports module 216, upon which it can then be provided in electronic form to the web administrator 210.

As discussed, the implementations shown in FIGS. 2A and 2B represent configurations in which a security vendor 204 can monitor activity for a customer 202 so as to demonstrate to the customer the benefits of implementing the security vendor's countermeasures. Such implementations may permit the customer to readily see objective representations of the benefits of implementing security countermeasures with their own system by way of showing an actual reduction of malware activity on their system.

In certain implementations, the collected data, such as in the form of before/after reports may be provided to customers other than those that were monitored. For example, retailer A may initially contact a vendor of security services and the vendor may generate data and reports like those discussed above and below. Subsequently, another web site operator, retailer B, may contact the vendor, and the vendor may determine that the type of site, format of the site and code, and security concerns of the web site operator match those of the initial retailer A. The vendor may provide the reports for retailer A, or a combined report for before/after data across many retailers or other servers of code who are determined to be relevant to retailer B, to retailer B in a manner that anonymizes the data so that the identity of retailer A or other contributor of data cannot be determined readily.

Figure 3A:
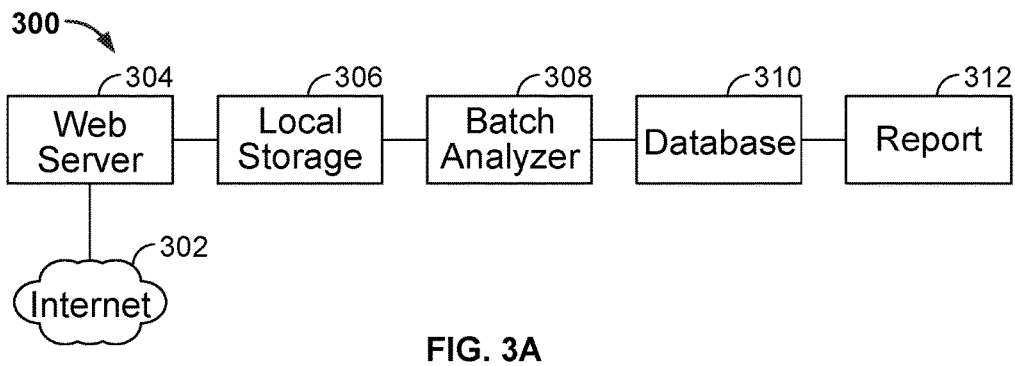
FIGS. 3A-3C are schematic diagrams of malware identification architectures.
Figure 3B:
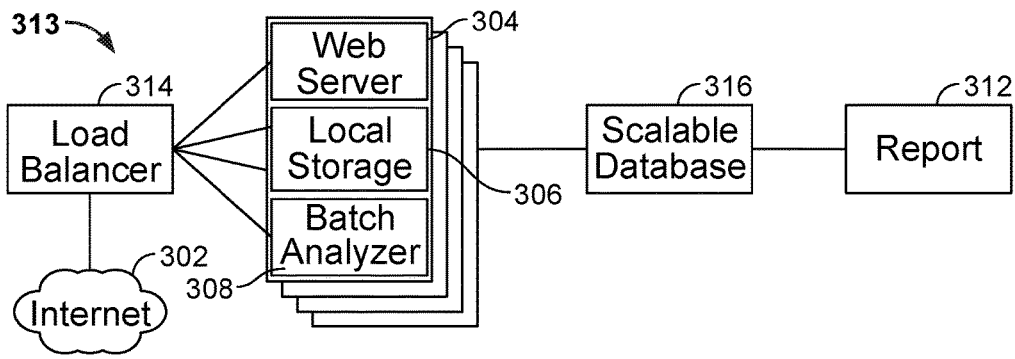
Figure 3C:
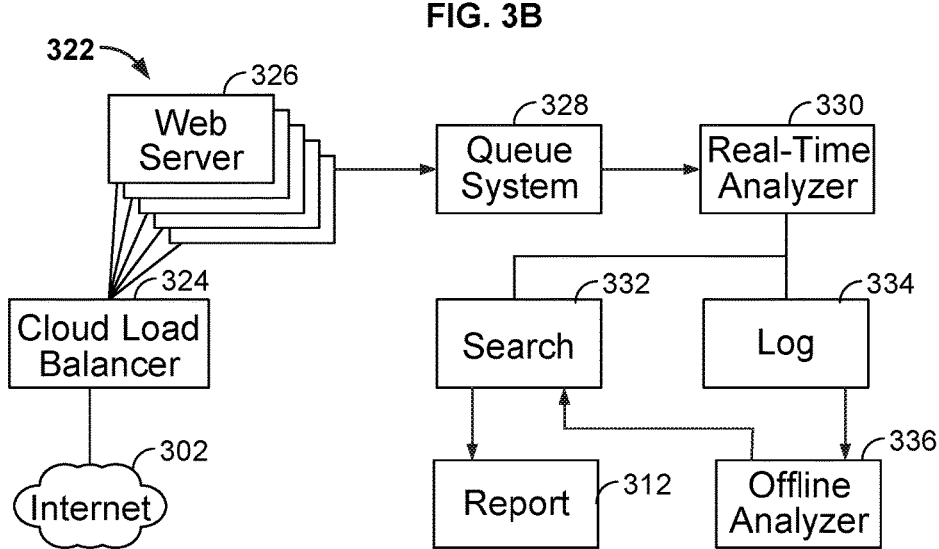

FIGS. 3A-3C are schematic diagrams of malware identification architectures. In general, the different architectures may be implemented as examples, and the choice of architecture may depend on the particular needs of a customer in a particular situation, where primary factors for selecting one architecture over another may include traffic volume and scalability that is required by the customer.

Referring now to FIG. 3A, a single machine architecture 300 is shown, and may be appropriate for a customer that has small traffic volume and one off-the-shelf web server or even a virtual machine in a cloud implementation, such as Amazon web services, for implementing the architecture 300.

As shown in the figure, a network such as Internet 302 may communicate with web servers 304 in a familiar manner, where web servers 304 may respond to requests from client devices by serving various forms of code for generating displays of web pages on the browsers of the requesting client devices. Local storage 306 may store data received from client devices that are operating injectable code that was served to them by web servers 304. The data may include data that characterizes the client devices themselves and data that characterizes interaction with the client devices in the form of typing and pointer manipulation, gesture inputs, and in the form of interaction with web forms served by web server 304. A batch analyzer 308 may correspond to bot analyzer 218 in FIGS. 2A and 2B, and may analyze the received data to make determinations about whether particular client devices are under the control of human or nonhuman users. The analysis may be performed essentially continuously or alternatively periodically, such as when data about the characterization and classification of the client devices is needed (e.g., when a report is requested by a network administrator). Such determination may involve determining that the data does not sufficiently indicate whether the user is human or nonhuman, and thus that the user type is indeterminate for the particular device.

A database 310 may store raw data received from the client devices, and also derived data generated from the raw data, such as aggregated data across multiple devices, including results of statistical analysis of the data received by various devices. The database 310 may also store one or more visual depictions of the data produced by report module 312, such as bar or line graphs indicating the prevalence of nonhuman users within a population of client devices over a period of time and changes in that prevalence.

Referring now to FIG. 3B, there is shown a multi-server implementation 313. Such an implementation may be employed by very large web site operators with a high volume of served pages. In this architecture 313, a network such as Internet 302 is again shown, but multiple servers are used to gather and analyze data from the client devices, so that a load balancer 314 is employed to route such data to different ones of the multiple servers, or server systems.

As shown, each such server or server system includes a web server 304, local storage 306, and a batch analyzer 308. Such components may operate in a manner similar to that discussed above for the single-server architecture 300 in FIG. 3A. The data generated from each such server system may then be stored, as raw data, derived data, and/or as graphical representations in a searchable database 316, which may provide data to, and receive client reports back from report module 312. Report module 312 may in turn provide reports to an administrator associated with the web servers and other servers in the architecture 313 so as to permit such administrator to objectively identify the presence of nonhuman users in the corpus of devices that are served by such system over time.

Referring now to FIG. 3C, there is shown a cloud-based architecture 322 for gathering and managing information like that discussed in FIGS. 3A and 3B. In general, such an architecture 322 can be used with large and popular monitored web sites, which may use, for example, the Amazon EC2 platform for an implementation.

The architecture 322 begins again with a network such as Internet 302. Interaction with entities (e.g., client devices requesting web code) through the network are mediated in this instance by a cloud load balancer 322 (e.g., AWS Elastic Loadbalancer) which may be a service provided as part of a broader range of cloud services, such as Amazon web server (AWS) services. The load balancer 322 may interact with a plurality of web servers 326, which may be physically separate servers from each other or virtualized servers in a broader server environment operated by a cloud hosting service, so as to distribute http and AJAX requests to the pool of web servers 326. Here, one central system receives all the relevant data from the different ones of the web servers 326 and analyzes the data together. For example, a queue system 328 (e.g., AWS Simple Queue System) may initially receive data from each of the different web servers, where the data represents characterization data for client devices that were served by the respective ones of the web servers. The queue system 328 rearranges the reported data, such as arranging it chronologically so as to match data that may have faced the same sort of user profile at a particular time with other such data, and otherwise prepare it to be fed to the next components in the architecture.

A real-time analyzer 330 (e.g., implemented as a farm based on AWS Storm) may be operating essentially continuously and receive such data from the queue system 328 so as to characterize particular devices as having human or nonhuman users as those devices report in their data. In certain implementations, the queue system 328 may receive reported data for multiple different customers serving different web pages, and may separate the information so that it is kept separate for reporting purposes for each of such customers (e.g., for confidentiality purposes). In such implementations, however, the data may be analyzed together so as to provide a larger base from which to perform statistical, learning, and other such analysis that may improve the ability of the architecture 322 to identify human from nonhuman users.

The real-time analyzer 330 thus makes determinations, like those discussed above and below, regarding whether particular client devices are operated by a human, a non-human, or whether such a determination cannot be accurately made from the data. The analyzer 330 may then provide certain raw or derived data to a log 334, which may represent each report provided by a client device, and which may be sorted in various manners, such as by the time at which the data was received from each client device. The raw information may be stored in permanent storage such as Amazon S3, and analysis results can be stored in NoSQL databases (e.g., Cassandra). As such, future analysis may be performed on the raw data, such as to improve the ability of a system to distinguish human from nonhuman actors, where the use of a corpus that spans many more client devices, many customers, and thus a much more diverse set of data, may enable more accurate determinations.

The search module 332 also receives data characterizing the various client devices and the manners in which they are used. An offline analyzer 336 may perform analysis and generate reports 312 at any time when such information is needed in a bulk analysis approach. For example, a security vendor may wish to have analysis conducted across data or client devices served by many different customer server systems, and may thus search, for example, on all reports that indicate use of a particular operating system or browser version. Such filtering of the data may be performed to produce a subset of data that can better be analyzed to identify particular botnets (e.g., by identifying a large number of client devices that cluster around certain anomalous parameters, and thus indicate that they are using the same malware to hide their true character). Separately, the offline analyzer 336 may be used to produce on-demand reports for particular clients, including reports like those discussed above and below to indicate the prominence of non-human users within a corpus of client devices served by a particular customer at particular points in time.

Figure 4A:
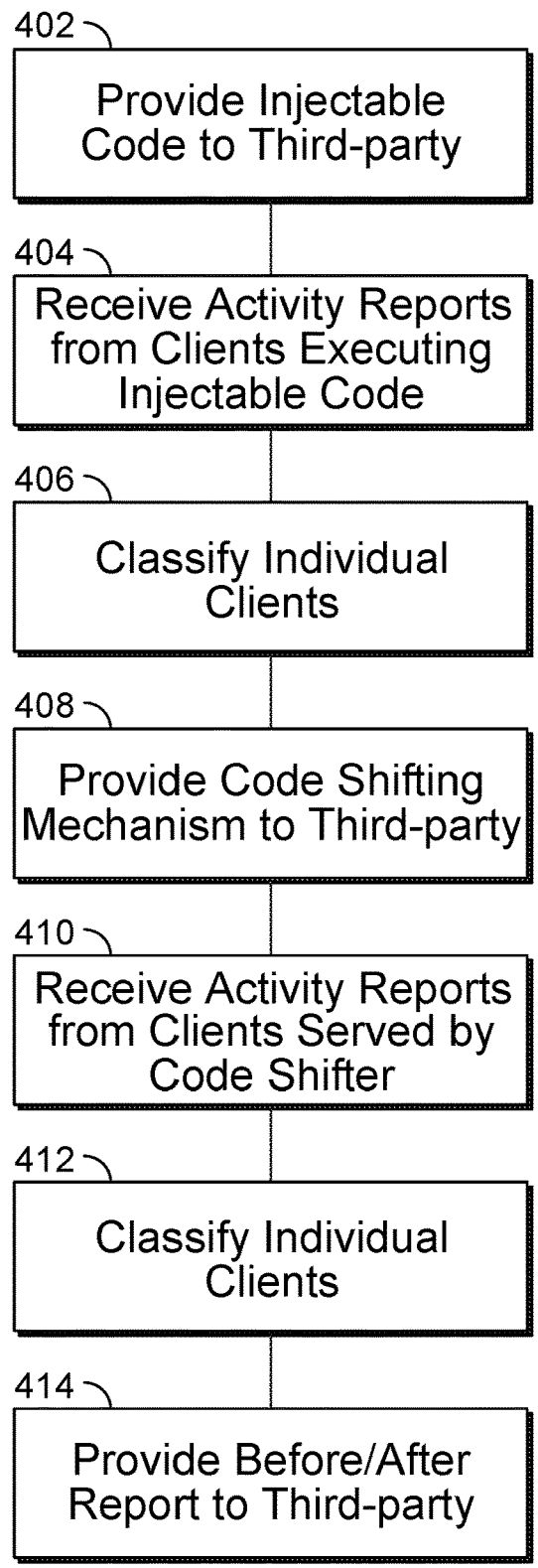
FIG. 4A is a flowchart of a process for reporting presence of malware to a third-party that serves code to the malware.

FIG. 4A is a flowchart of a process for reporting presence of malware to a third-party, such as a financial institution, that serves code to client computing devices that are executing the malware. In general, the process involves providing code to a third-party that the third-party may incorporate into other code that it serves to client computing devices. Such incorporated code may cause data to be relayed to the party that provided the initial injectable code, where such data can be used by that party to identify whether the client computing devices are controlled by human users or are instead controlled by bots, so as to assist the party that served the code in taking actions to ameliorate possible bot problems.

The process begins at box 402, where injectable code is provided to a third-party such as a financial institution. Such code may be provided by a company that provides security services for different organizations that run web server systems. Such organizations may be subjected to threats by malware, such as programs that operate automatically in the form of bots and botnets for malicious purposes. Those bots may work to interfere with the normal operation of such a web server system, or to defraud the operator of the web server system, the users who are served code by the web server system, or both.

At box 404, activity reports (which may include characterization data like that discussed above) are received from clients that execute the injectable code. Such clients may have received the injectable code for execution by the act of the third-party incorporating the code into other code that it served to such clients. For example, the third-party may be a banking enterprise that serves code for generating forms by which its customers may enter data about their finances and their accounts. The injectable code may have been incorporated by the banking enterprise in an unobtrusive manner, so that the presence of the injected code is not readily visible to a human user of the client, or to malware that may be operating on the client.

The injectable code may include, for example, code that monitors interactions with components outside the code served by the banking enterprise, and even outside a browser that is rendering and executing such served code. For example, the injectable code may analyze a document object model (DOM) for a browser on a particular client and identify predetermined features of that DOM, such as features that may indicate capabilities of a computer on which the browser is running, plug-ins for such a browser, and other similar information. The injectable code may also monitor event handlers on the client device and gather data about such event handlers. For example, the injectable code may identify which keys are pressed on a keyboard of the client device, and the relative times at which such keys are pressed. Also, an event handler for a pointing device on the client device may be monitored, which may record the fields in which the device moves, and in which the device pointer was located when a click occurred. All such data may then be packaged and sent to the initiating party, as shown in box 404.

In box 406, individual client devices are classified by the organization that provided the injectable code. Such classification may take into account a number of different factors and may be deterministic or nondeterministic at different levels. For example, the classification may be deterministic at three levels, where some client devices are classified as definitely being operated by human operators, others are classified as definitely being operated by bots, and a third class are identified as being indeterminate with respect to what sort of user is operating them. In other implementations, the classifications may be more discreet, such as by providing a number along a range from 0 to 100 for each device, where zero indicates that the user is most likely nonhuman, 100 indicates that the user is least likely human, and each value between represent a approximately proportionate likelihood that the user is either human or nonhuman.

The factors that may be taken into account in making such determination may include both characteristics of the particular client device, and characteristics of the manner in which the client device was observed to have been used by its user. The characteristics of the client device may include factors such as the make and model of the hardware for the client device, other hardware added to the client device, the make and version of a browser or other applications on the device, amount and type of memory and other storage in general configurations on the device, plug-ins loaded for a browser on the device, and other indications that characterize the device itself, apart from a particular way in which it may be used during a session. For example, a device having a particular screen resolution may be considered most likely to have a human user because it is known to be a rare resolution for devices that are infiltrated by bot networks (e.g., because the resolution is very high and indicative in a high monetary investment is display hardware). Also, a client device indicating that it has particular anti-bot software loaded on it, and where such indication suggests that it is legitimate software, may cause the client device to be considered likely to have an automatic bot user.

In other instances, incongruities in the device characteristics may indicate the presence of a bot, such as where the device is reporting the presence and operation of a particular browser version but other characteristics of the device are inconsistent with such a browser version, thus indicating that the device is falsely and clumsily reporting that browser version, and therefore is more likely to be used by nefarious parties, and more likely to be a bot. Other instances by which the provider of the code can determine that some characteristic of the client device is being hidden may also be used to infer that malware is operating on the device.

Data that characterizes particular use of the device may include data characterizing interaction with input devices for the client device, such as a keyboard and pointing device (e.g., a mouse), and where such data was gathered by monitoring the event handlers as discussed above. For example, an organization may develop a template or profile for typical human behavior and one for typical bot behavior with respect to such event handlers, and may compare data received from each client to such profiles. The profiles may be generated automatically by way of a machine learning system that is seeded with such data and provided an indication whether each instance of the data it is provided involved a human user or a nonhuman user. The profiles may include, for example, the speed and cadence with which clicks on a pointing device or other selections on a pointing device are made, the speed or cadence with which keys on a keyboard are pressed, including by considering the locations of particular keys on the keyboard and how such locations may affect the speed or cadence of natural human typing, and other similar factors.

Certain particular factors may be considered to overwhelm others when determining that a client device is operated by a nonhuman, such as the indication of clicking or typing or other movement that is known to be completely inconsistent with that controlled by a human user, the submission of a form without the presence of any mouse or keyboard activity, and other factors described above and below. Other disqualifying activity may include data that is determined to perfectly or too-closely match interaction data from another client device, so as to indicate that the inputs occurred under control of an automated script common to the two devices. Where such activity is identified, the process may automatically identify a client as being used by a nonhuman user, or may generate a very high or low score with respect to the user interaction portion of an analysis so as to heavily bias an ultimate determination toward identifying a device as being controlled by a bot.

The classification of individual clients may also be aggregated, such as to generate statistics about such classification. For example, determinations may be made of a percentage of all clients that were served the injectable code that are classified in each of the different classification bins, such as clearly human, clearly bot, and indeterminate, in the example above. Greater granularity may also be provided in the statistics, such as indicating bot/human/indeterminate determinations broken down according to the type of computer used by a user (e.g., by brand, or by style such as desktop, laptop, tablet, and smartphone), breakdown for particular web pages for a customer such as a financial institution (e.g., more bots interacting with pages that involve collection of private information), particular geographic locations such as different countries and the prevalence of bots in those countries (e.g., determined by IP addresses), and other types of breakdowns that may be of interest to a particular client. For example, a client may want to know that bot use is particularly heavy for certain IP addresses or ranges of IP addresses, so as to apply heavier countermeasures to devices that request content from such IP addresses, and to apply lighter countermeasures that may interfere less with code served by such an organization for other IP addresses that indicate a lower risk.

At box 408, the services of a code shifting mechanism is provided to the third-party. For example, the entity that provided the injectable code may also provide mechanisms for preventing the successful operation of bot nets and other malware. One example service provided by such an entity may be hardware, software, or cloud services that are used to change the manner in which code of the entity's customers is served each time that it is requested by a client computing device.

For example, as explained above and below, particular components may analyze the code to be served by the financial institution so as to identify elements in the code that can be changed without affecting a manner in which the code is presented on a client computing device. Such elements may include function names and other names that are not displayed to a user of the device. The analysis may also include identifying all locations of a particular function name or other element in the various types of code to be served so that the name can be changed consistently across the code without breaking the code when it operates on a web browser. The analysis may result in the generation of a mapping that may be used multiple times for the serving of the code. For example, each time any user requests the code after it has been analyzed, the mapping may be used to point to particular instances in which an element occurs, and then the element may be changed in a way that is consistent across the code for that particular serving of the code, but is different for each subsequent serving of the code or that differs at least for each N servings of the code. Thus, for example, the shifting service or mechanism provided to the financial institution may create a moving target in the naming of particular elements and in other representations in the code that will prevent automated systems from identifying how the code operates and prevent them from exploiting the code because of the unpredictability created by the ever-changing nature of the code.

At box 410, activity reports are received from clients that are served code by way of the code shifting mechanism. Some of the clients may be the same as clients that provided reports in box 404, and others may be different, as certain users may return to the site multiple times as customers, while other users would be new to the site. The activity reports may be similar to the activity reports received at box 404, but the code shifting mechanism may have interfered with the ability of bots to properly run the code, and therefore, few or no reports may be received from bots in such a situation, or the reports may show different types of activity on client devices operating with bots.

At box 412, individual clients are classified in a manner similar to the classification that occurred in box 406. For example, characteristics of the devices and of the manner in which they were used may be matched against profiles or templates indicating whether such usage is indicative of a human user or a nonhuman user for the devices. The classifications may be aggregated and statistical information may be generated from them similar to the statistical information generated before the shifting mechanism was provided to the third-party.

At box 414, the data from before the shifting may be combined with data from after the shifting to create a before and after, or A/B, representation of the operation of the third parties. For example, the relative percentage of client devices that interact with the banking institution's code that are classified into each of the relevant bins may be graphed across a time period, so that the graph shows the elimination of bots from such a population in response to the introduction of the shifting mechanism. Such a report may then be provided in electronic form to the third-party to immediately and graphically represent the benefit of the shifting mechanism for the third-party.

In such an example, reports of indeterminate client devices may be useful because providing such a report in this context may not require the vendor to definitely classify all client devices, but simply to identify what it can about the devices. Often, vendors may instead provide definitive characterizations even where they cannot accurately make such characterizations, but such manipulation of the data for a customer may not be required in the situations discussed here.

As already discussed, other uses may also be made of the data showing bot activity before and after the introduction of countermeasures. For example, the introduction of countermeasures may be performed as part of a test in order to identify whether the particular countermeasure is effective in reducing bot activity. The injected code may provide automatic or human analysts with indications of how bots are operating in a population of client devices, and the analysts may work with programmers to generate a plurality of different candidate countermeasures. Such countermeasures may then be selectively deployed one-by-one or in pairs or other groups, and their effect on bot activity may be monitored. Those countermeasures that are determined to provide the greatest interference with bot activity may then be deployed across most or all of a customer's page servings, and across multiple customers. In certain embodiments, a countermeasure may be associated by an analyst with a particular element or elements of the served code, or other parameters of the served code, and the countermeasure may be applied for customers that are determined to have the same or similar parameters in their served code, so as to increase the odds that the countermeasure will work for them also.

Figure 4B:
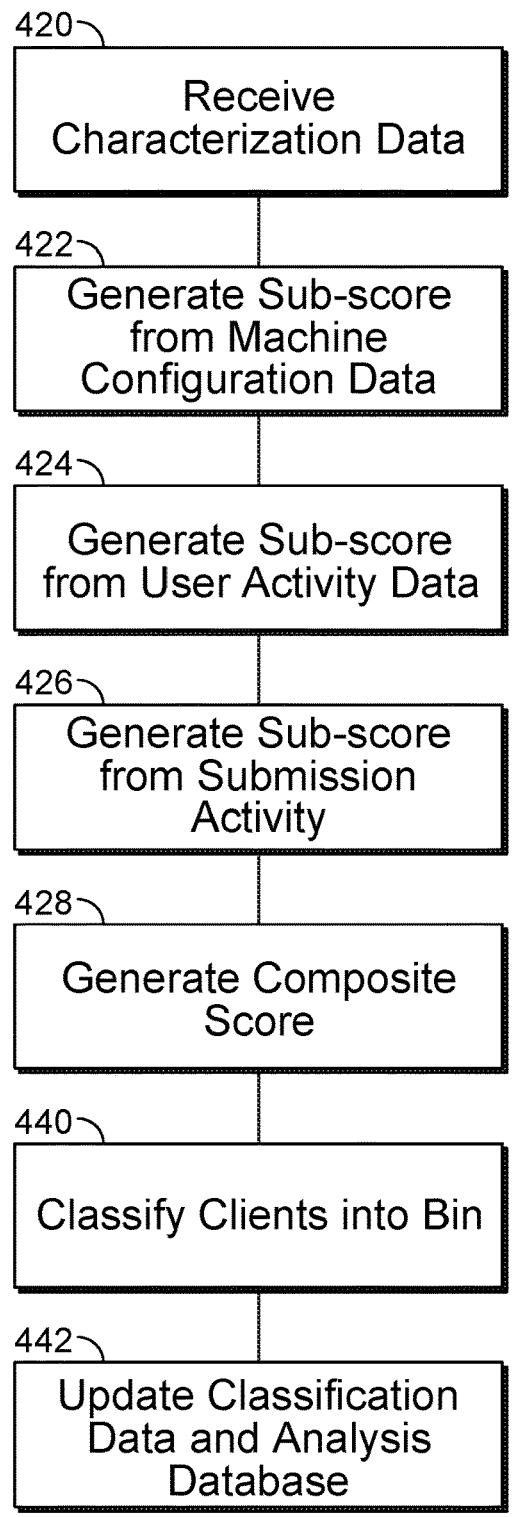
FIG. 4B is a flowchart of a process for identifying whether a client device is being operated by malware.

FIG. 4B is a flowchart of a process for identifying whether a client device is being operated by malware. In general, the process shows examples of mechanisms that a security vendor or other party may take in classifying a plurality of different client devices as being operated by human or nonhuman users.

The process begins at box 420, where characterization data for one or more client devices is received. As discussed above, the characterization data may characterize the device itself (e.g., memory and other storage, other hardware information, operating system information, browser information, and plug-in information) and may characterize user interaction with the device (e.g., pointer movement and clicking, keyboard presses, gestures of or around the device, and form filling activity). The receipt of such information may occur in real time as it is reported by the devices or may be recovered from a database of previously-reported data, such as data stored in a long of individual reports from particular individual client devices.

The classification process in this example is based on building up a score that indicates a likelihood that a particular device was operated by a human or nonhuman user, from multiple sub-scores. Thus, at box 422, a sub-score for machine configuration data is generated. Such sub-score may use the data that characterizes a client device itself. For example, it may have been previously determined that botnets are more likely to infect a particular brand of computer hardware, or to use computers with a particular amount of RAM memory or a particular screen resolution. The presence of such factors may cause the machine configuration sub-score to be particularly high (and the presence of both will drive it even higher). Other factors may override all other considerations, even in a system that otherwise weights multiple factors as inputs. For example, certain hardware information may definitively identify a device as controlled by a bot, such as information that indicates that a device is surreptitiously trying to hide its true identity (e.g., by passing an invalid user agent string).

At box 424, a sub-score is generated using user activity data, which represents how a user interacted with a web page that was served with monitoring code that reported back the data. For example, clicks or key presses that are too fast or too even to represent human input may be used to generate a high sub-score to indicate likelihood of bot interaction. More complex analysis may also be used, such as by characterizing "normal" human movement of a pointer through the study of motion data from a large number of known human users, and comparing signatures or templates for such movement to the data received from a device that is to be classified as being operated by a human or nonhuman.

At box 426, a third sub-score is generated, this time from submission activity on the device, such as entry of data into fields in one or more forms on a web page. Such data may indicate which fields were filled out, the order in which they were filled out, and the characters and timing of the characters entered into the fields. In determining whether the user was human or nonhuman, such data may be checked against permissible entries for the fields (e.g., checking maps data to confirm that a town and state entered into a form match each other), against entries from other client devices (e.g., in which matching repeated entries between devices are an indication of automated nonhuman entry), and other considered factors. Also, in some implementations, dummy fields may be included in a form and hidden from human user view when the form is displayed, so that entry of data into those fields indicates the presence of a nonhuman user operating a particular device.

At box 428, a composite score is generated for a particular client device, such as a lower score indicating that the device is controlled by a human user, and a higher score indicating that the device is likely controlled by a nonhuman user (or vice-versa). Such score may be built up from the sub-scores previously determined, such as by combining the sub-scores in a weighted manner, with the weighting reflecting predetermined importance of each sub-category in affecting the likelihood that a user was human or nonhuman. The various categories may also be incorporated in a more holistic manner rather than category-by category addition, by identifying each of various different parameters that are predetermined to affect the likelihood of nonhuman operation, and feeding them all into a single formula or other mechanism for combining such parameters to generate an overall indication of human/nonhuman action.

At box 430, the client is classified into a bin. In certain implementations, three bins may be provided—i.e., most likely a human operator, most likely a nonhuman operator, and indeterminate with respect to human or nonhuman operator. More or fewer bins may be provided.

Finally, at box 432, classification data and an analysis database may be updated. For example, the classification for a particular device may be added to a list of classified devices, so as to more readily determine aggregated classifications across a large group of devices that have been served code from a server system and have submitted data in response to receiving injected code with the web server code. The updating may also involve adding data to the database to be used in better classifying devices that submit data in the future. For example, the data showing interaction with a device may be hashed and the hash may be compared to hashes of corresponding data from devices in the future so as to quickly indicate whether there is a match, which would indicate that the two devices were operated under the control of matching bot malware.

Figure 5:
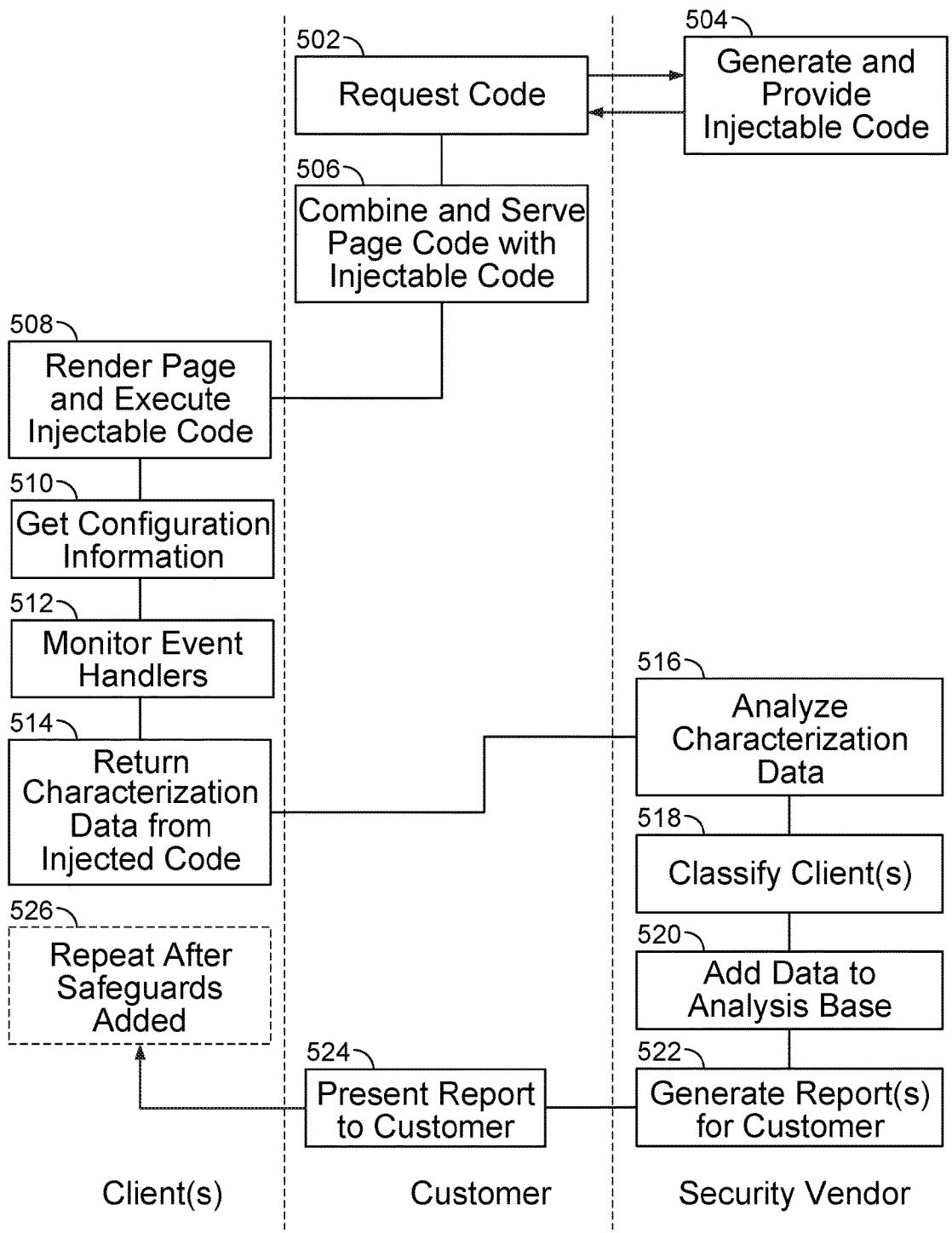
FIG. 5 is a swim lane diagram of a process for reporting presence of malware to a customer of a security company.

FIG. 5 is a swim lane diagram of a process for reporting presence of malware to a customer of a security company. In general, the process shown here is similar to that shown in FIGS. 4A and 4B, but is shown here according to particular example components of a system that may carry out particular steps of the process. The process here, as with the processes of FIGS. 4A and 4B may be carried out by systems like those shown in FIGS. 1, 2A, 2B, 3A-3C, 7, and 8.

The process in this example is carried out by computing equipment operated by a security vendor, a customer of the security vendor (current or prospective), and multiple clients. The process begins at box 502, where the customer requests injectable code from the vendor. Such request may occur by the customer loading such code from a web site sponsored by the vendor, by the vendor meeting with the customer as part of a sales process for selling the customer countermeasure products or services, by the customer contacting the vendor and the vendor emailing files for the injectable code, or in other appropriate manners.

At box 504, the security vendor generates injectable code for the customer and the code is provided back to the customer in response to the request. The injectable code may be generated custom for the particular customer or may take a more general form that may be used by multiple different customers. In a general form, for example, the injectable code may point to other code hosted by the security vendor that may perform analysis with respect to client devices that are served by the customer (e.g., a URL that points to JavaScript served by the security vendor). In other implementations, the customer may receive from the security vendor all code that is needed to perform the monitoring and reporting from client devices to which the customer serves code, and may serve that code with its own code.

At box 506, the requested and provided injectable code is combined with and served with page code from the customer. For example, the customer may simply paste the injectable code into a page of HTML code that it would otherwise serve to client devices, so that the code is served together in one single serving in response to requests from client devices to the customer.

At box 508, a client device receives the code served by the customer and uses it to render a page and execute the injectable code. Such execution may cause the injectable/injected code to begin monitoring the static status of the client device, and transient status of the client device. The static status may include static values such as the amount and type of memory on the device, the make and model of the device, the make and version of the operating system and browser executing on the device to render the served code, and similar information. The monitoring of transient status may include obtaining data from event handlers on the device that indicates how a user interacts with the device in manners such as those discussed above (e.g., speed and pattern of clicking, moving a pointer, gestures, and typing). Therefore, at box 510, the injectable code or other code working in cooperation with the injectable code gathers configuration information for the device, such as information that indicates hardware and software on the device, and at box 512, the event handlers are monitored by such code.

At box 514, characterization data is returned from the injectable code that has been injected with the code served by the customer. Such data may be returned by the client to the security vendor (e.g., directly or through the customer) which, at box 516, analyzes the returned characterization data. In typical implementations, the security vendor will have many customers or potential customers, and be constantly receiving flows of data with such characterization data being returned by different client devices served by the different customers. The code returning the data may be programmed to provide an identifier for the particular customer so that the security vendor can separate such data for analysis and reporting as needed, and additionally can include the data that is captured regarding the client devices and their operation. The analysis performed at box 516 may take a variety of forms including those discussed above for providing scores to particular parameters reported back from the client devices, and combining the scores to generate an ultimate indication of whether each particular client device is likely to be operated by a human or nonhuman user. At box 518, the particular clients are classified, such as into classifications of being operated by human users, nonhuman users, or an indeterminate identification of whether the user is human or nonhuman.

At box 520, data from the analysis and classification is added to an analysis base for the security vendor. For example, the classification of a particular client device may be added to data that tracks the number of client devices of each type to which a particular customer has served code. The raw data received from the client device may be stored for further analysis in making determinations about back client device, such as if the client device is initially identified as being operated by a bot, and then the code is subsequently analyzed to help the security vendor identify a signature for the bot so that the security provider's countermeasures code can be updated to more readily interfere with the operation of bots programmed in the same or similar manner.

At box 522, reports are generated for the customer, and may include before/after, or A/B, reports that indicate a level of bot activity for code served by the customer both before its code has been subjected to countermeasure activity provided by the security vendor, and after the code has been subjected to such countermeasure activity. Such countermeasure activity is described above and below, and particularly with respect to the serving of polymorphic code as described in FIG. 7 below. At box 524, the report is presented to the customer. Such report may be presented by a representative of the security vendor, or may be electronically communicated (e.g., via email) to the customer and viewed by the customer in an appropriate manner. Box 526 indicates that such activity or portions of such activity may be repeated, such as the serving of code to different client devices over time, and the serving and tracking of operations both before countermeasures are deployed for the customer and after the countermeasures are deployed, and where such before/after activity is tracked separately so as to permit the generation of a before/after report for the customer.

Although the process is discussed here in terms of a security vendor analyzing the data and presenting a report to a customer, such report may also be generated by the customer's own computer system using software provided by the security vendor, when the customer is sophisticated enough to manage such analysis. In such an implementation, the data may also be passed to the security vendor, for performing further analysis for the customer and/or adding the data to characterization data received form client devices that were served by many other customers, so as to provide a very large database of characterization data that the vendor may use to better develop countermeasure systems.

Figure 6:
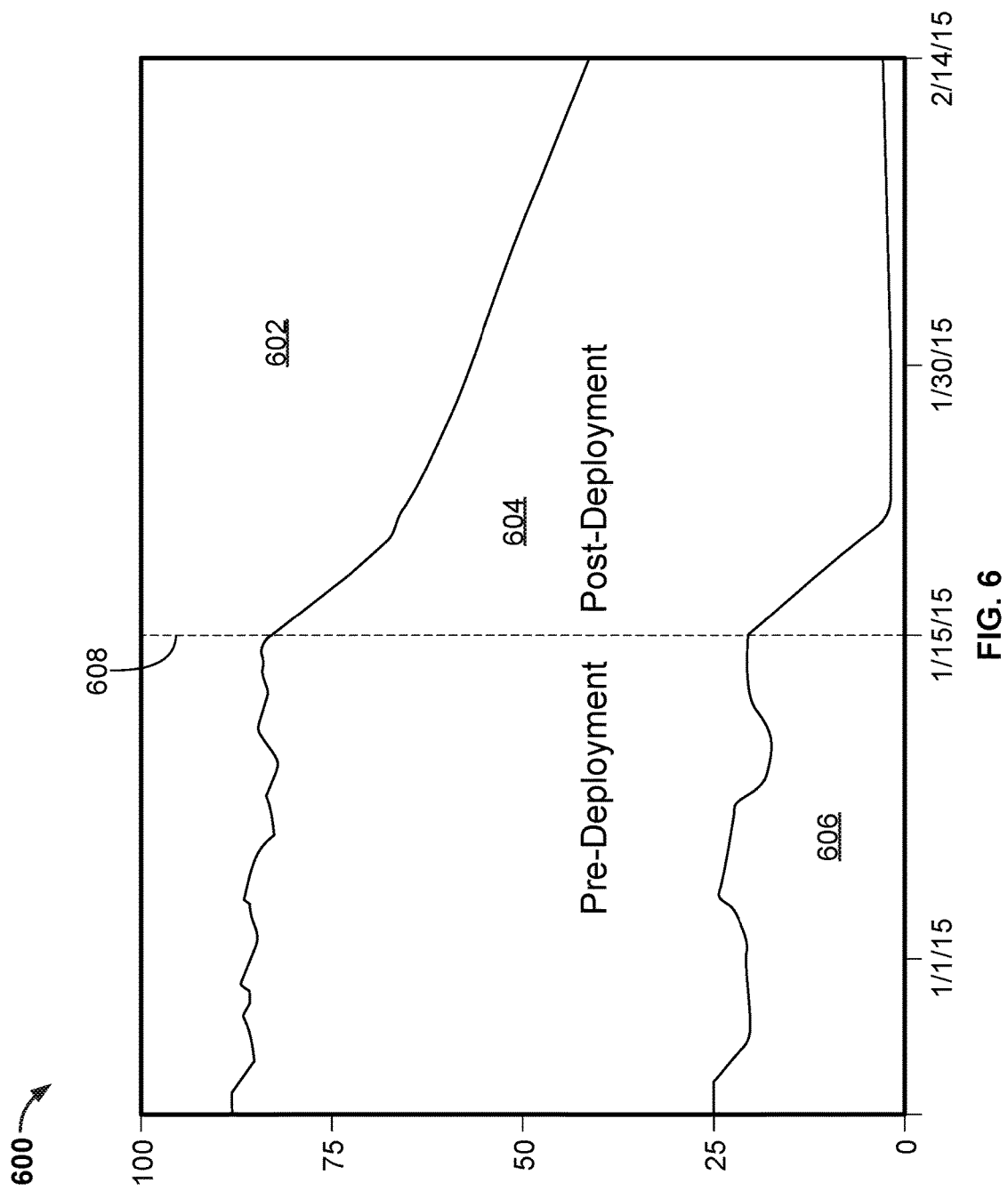
FIG. 6 is an exemplary report showing changes in malware incidence in a population of machines served by a web server system.

FIG. 6 is an exemplary report showing changes in malware incidence in a population of machines served by a web server system. The report in this example shows a graph 600 that represents time on its x-axis, in calendar days, and percentage of a client device population on its y-axis, reaching to 100% of the population. The population may be all client devices that were served augmented code (e.g., which was served with injectable code) by a particular organization and that reported back data about their activity for analysis by a company that generated the report.

The report has three areas, which may be visually distinguished from each other by separating lines and color or hashing. Area 602 represents client devices that have been determined by an analysis system to most likely be operated by human operators, typically legitimate customers or visitors of a web site served by the organization that is being studied. Area 606 represents client devices that have been determined by the analysis system to most like be operated by nonhuman operators, such as bots that may be benign (e.g., search engine crawlers) or malicious (e.g., malware). Area 604 indicates indeterminism with respect to whether particular devices are operated by human or nonhuman users.

A vertical line 608 indicates the deployment, on January 15, of countermeasures for the particular server of web code. Thus, a security service company may have tracked operation of client devices for 6 weeks prior to such deployment to obtain the data shown to the left of line 608 and then deployed the countermeasures and continued tracking the same data for client devices that were served code from the entity after that date.

The graph shows its viewer that the presence of nonhuman visitors dropped precipitously after January 15 because those users were unable to intereract with the code served to them, and likely threw errors in their attempts to interact with the code. The prevalence of human-identified users likely stayed the same or varied in a natural manner as the demand for the web page being monitored varied, but the percentage of visits by human users increased as the visits by nonhuman users virtually disappeared.

At the same time, the percentage of indeterminate users may fall generally over time as the system collects more data on attempts to interact with the served code and updates its knowledge base with such information. For example, if it is determined that the countermeasures are almost essentially totally effective in interfering with bots, an analysis system may assume that all reporting clients are operated by human users, and can learn parameters of the reporting client devices so as to develop a profile of parameters that are indicative of human use for other servers of web code who have not yet introduced countermeasures. Such information may also permit the generation of more effective countermeasures by using determined signatures of bot activity to block interaction when such activity is seen from a future client device.

Figure 7:
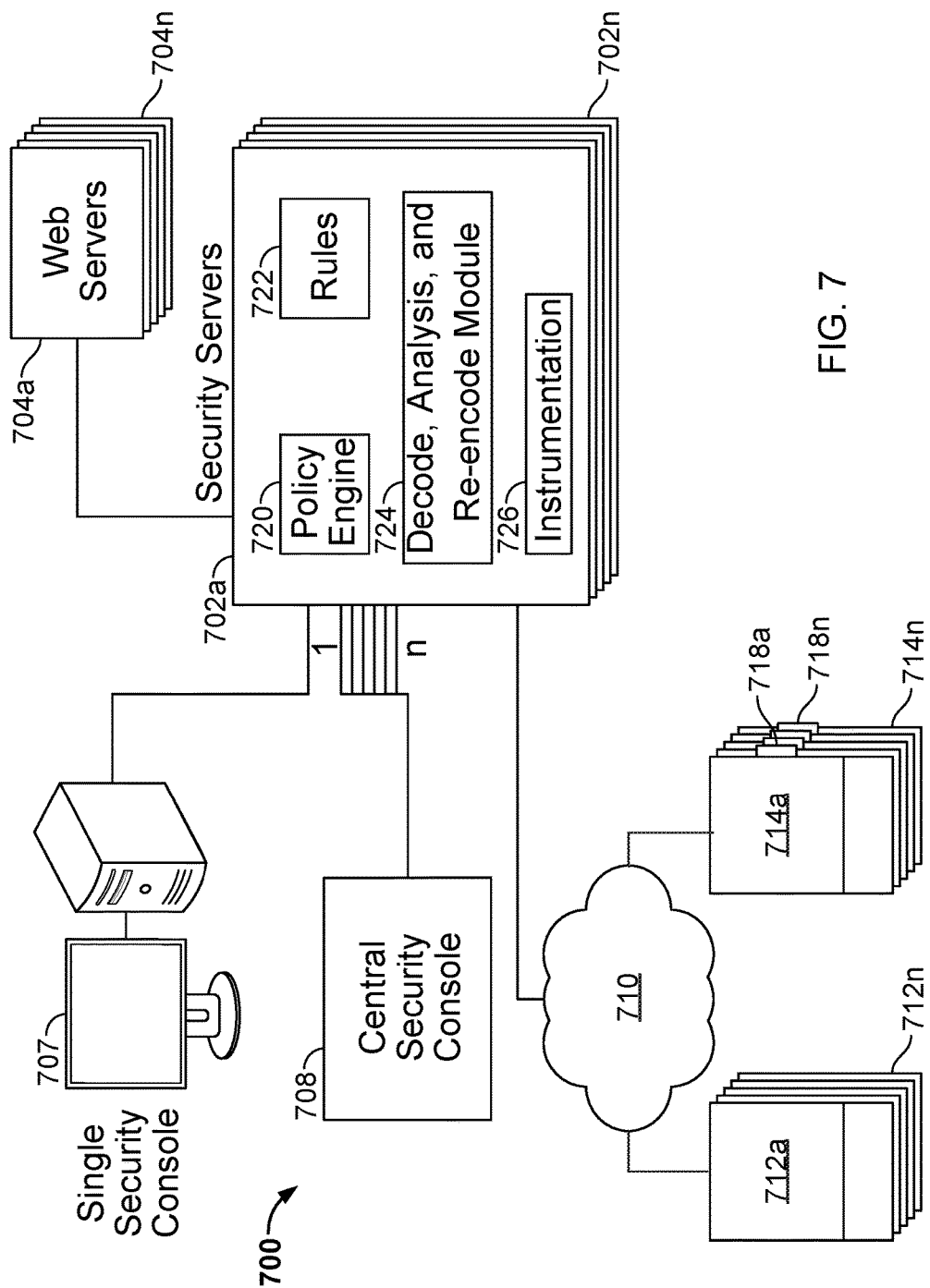
FIG. 7 shows a system for serving polymorphic and instrumented code.

FIG. 7 shows a system 700 for serving polymorphic and instrumented code. Generally, polymorphic code is code that is changed in different manners for different servings of the code in manners that do not affect the manner in which the executed code is perceived by users, so as to create a moving target for malware that tries to determine how the code operates, but without changing the user experience. Instrumented code is code that is served, e.g., to a browser, with the main functional code and monitors how the functional code operates on a client device, and how other code may interact with the functional code and other activities on the client device.

The system 700 may be adapted to perform deflection and detection of malicious activity with respect to a web server system. Deflection may occur, for example, by the serving of polymorphic code, which interferes with the ability of malware to interact effectively with the code that is served. Detection may occur, for example, by adding instrumentation code (including injected code for a security service provider) that monitors activity of client devices that are served web code.

The system 700 in this example is a system that is operated by or for a large number of different businesses that serve web pages and other content over the internet, such as banks and retailers that have on-line presences (e.g., on-line stores, or on-line account management tools). The main server systems operated by those organizations or their agents are designated as web servers 704a-704n, and could include a broad array of web servers, content servers, database servers, financial servers, load balancers, and other necessary components (either as physical or virtual servers).

In this example, security server systems 702a to 702n (which may implement components like the shifter 110 described with respect to FIG. 1) may cause code from the web server system to be supplemented and altered. In one example of the supplementation, code may be provided, either by the web server system itself as part of the originally-served code, or by another mechanism after the code is initially served, such as by the security server systems 702a to 702n, where the supplementing code causes client devices to which the code is served to transmit data that characterizes the client devices and the use of the client devices in manners like those discussed in the many examples above. As also described below, other actions may be taken by the supplementing code, such as the code reporting actual malware activity or other anomalous activity at the client devices that can then be analyzed to determine whether the activity is malware activity.

The set of security server systems 702a to 702n is shown connected between the web servers 704a to 704n and a network 710 such as the internet. Although both extend to n in number, the actual number of sub-systems could vary. For example, certain of the customers could install two separate security server systems to serve all of their web server systems (which could be one or more), such as for redundancy purposes. The particular security server systems 702a-702n may be matched to particular ones of the web server systems 704a-704n, or they may be at separate sites, and all of the web servers for various different customers may be provided with services by a single common set of security servers 702a-702n (e.g., when all of the server systems are at a single co-location facility so that bandwidth issues are minimized).

Each of the security server systems 702a-702n may be arranged and programmed to carry out operations like those discussed above and below and other operations. For example, a policy engine 720 in each such security server system may evaluate HTTP requests from client computers (e.g., desktop, laptop, tablet, and smartphone computers) based on header and network information, and can set and store session information related to a relevant policy. The policy engine may be programmed to classify requests and correlate them to particular actions to be taken to code returned by the web server systems before such code is served back to a client computer. When such code returns, the policy information may be provided to a decode, analysis, and re-encode module, which matches the content to be delivered, across multiple content types (e.g., HTML, JavaScript, and CSS), to actions to be taken on the content (e.g., using XPATH within a DOM), such as substitutions, addition of content, and other actions that may be provided as extensions to the system. For example, the different types of content may be analyzed to determine naming that may extend across such different pieces of content (e.g., the name of a function or parameter), and such names may be changed in a way that differs each time the content is served, e.g., by replacing a named item with randomly-generated characters. Elements within the different types of content may also first be grouped as having a common effect on the operation of the code (e.g., if one element makes a call to another), and then may be re-encoded together in a common manner so that their interoperation with each other will be consistent even after the re-encoding.

Both the analysis of content for determining which transformations to apply to the content, and the transformation of the content itself, may occur at the same time (after receiving a request for the content) or at different times. For example, the analysis may be triggered, not by a request for the content, but by a separate determination that the content newly exists or has been changed. Such a determination may be via a "push" from the web server system reporting that it has implemented new or updated content. The determination may also be a "pull" from the security servers 702a-702n, such as by the security servers 702a-702n implementing a web crawler (not shown) like web crawler 162 in FIG. 1 to recursively search for new and changed content and to report such occurrences to the security servers 702a-702n, and perhaps return the content itself and perhaps perform some processing on the content (e.g., indexing it or otherwise identifying common terms throughout the content, creating DOMs for it, etc.). The analysis to identify portions of the content that should be subjected to polymorphic modifications each time the content is served may then be performed according to the manner discussed above and below.

A rules engine 722 may store analytical rules for performing such analysis and for re-encoding of the content. The rules engine 722 may be populated with rules developed through operator observation of particular content types, such as by operators of a system studying typical web pages that call JavaScript content and recognizing that a particular method is frequently used in a particular manner. Such observation may result in the rules engine 722 being programmed to identify the method and calls to the method so that they can all be grouped and re-encoded in a consistent and coordinated manner.

The decode, analysis, and re-encode module 724 encodes content being passed to client computers from a web server according to relevant policies and rules. The module 784 also reverse encodes requests from the client computers to the relevant web server or servers. For example, a web page may be served with a particular parameter, and may refer to JavaScript that references that same parameter. The decode, analysis, and re-encode module 724 may replace the name of that parameter, in each of the different types of content, with a randomly generated name, and each time the web page is served (or at least in varying sessions), the generated name may be different. When the name of the parameter is passed back to the web server, it may be re-encoded back to its original name so that this portion of the security process may occur seamlessly for the web server.

A key for the function that encodes and decodes such strings can be maintained by the security server system 702 along with an identifier for the particular client computer so that the system 702 may know which key or function to apply, and may otherwise maintain a state for the client computer and its session. A stateless approach may also be employed, whereby the system 702 encrypts the state and stores it in a cookie that is saved at the relevant client computer. The client computer may then pass that cookie data back when it passes the information that needs to be decoded back to its original status. With the cookie data, the system 702 may use a private key to decrypt the state information and use that state information in real-time to decode the information from the client computer. Such a stateless implementation may create benefits such as less management overhead for the server system 702 (e.g., for tracking state, for storing state, and for performing clean-up of stored state information as sessions time out or otherwise end) and as a result, higher overall throughput.

The decode, analysis, and re-encode module 784 and the security server system 702 may be configured to modify web code differently each time it is served in a manner that is generally imperceptible to a user who interacts with such web code. For example, multiple different client computers may request a common web resource such as a web page or web application that a web server provides in response to the multiple requests in substantially the same manner. Thus, a common web page may be requested from a web server, and the web server may respond by serving the same or substantially identical HTML, CSS, JavaScript, images, and other web code or files to each of the clients in satisfaction of the requests. In some instances, particular portions of requested web resources may be common among multiple requests, while other portions may be client or session specific. The decode, analysis, and re-encode module 724 may be adapted to apply different modifications to each instance of a common web resource, or common portion of a web resource, such that the web code that it is ultimately delivered to the client computers in response to each request for the common web resource includes different modifications.

In certain implementations, the analysis can happen a single time for a plurality of servings of the code in different recoded instances. For example, the analysis may identify a particular function name and all of the locations it occurs throughout the relevant code, and may create a map to each such occurrence in the code. Subsequently, when the web content is called to be served, the map can be consulted and random strings may be inserted in a coordinated matter across the code, though the generation of a new name each time for the function name and the replacement of that name into the code, will require much less computing cost than would full re-analysis of the content. Also, when a page is to be served, it can be analyzed to determine which portions, if any, have changed since the last analysis, and subsequent analysis may be performed only on the portions of the code that have changed.

Even where different modifications are applied in responding to multiple requests for a common web resource, the security server system 702 can apply the modifications in a manner that does not substantially affect a way that the user interacts with the resource, regardless of the different transformations applied. For example, when two different client computers request a common web page, the security server system 702 applies different modifications to the web code corresponding to the web page in response to each request for the web page, but the modifications do not substantially affect a presentation of the web page between the two different client computers. The modifications can therefore be made largely transparent to users interacting with a common web resource so that the modifications do not cause a substantial difference in the way the resource is displayed or the way the user interacts with the resource on different client devices or in different sessions in which the resource is requested.

An instrumentation module 726 is programmed to add instrumentation code to the content that is served from a web server. The instrumentation code is code that is programmed to monitor the operation of other code that is served. For example, the instrumentation code may be programmed to identify when certain methods are called, when those methods have been identified as likely to be called by malicious software. When such actions are observed to occur by the instrumentation code, the instrumentation code may be programmed to send a communication to the security server reporting on the type of action that occurred and other meta data that is helpful in characterizing the activity. Such information can be used to help determine whether the action was malicious or benign.

The instrumentation code may also analyze the DOM on a client computer in predetermined manners that are likely to identify the presence of and operation of malicious software, and to report to the security servers 702 or a related system. For example, the instrumentation code may be programmed to characterize a portion of the DOM when a user takes a particular action, such as clicking on a particular on-page button, so as to identify a change in the DOM before and after the click (where the click is expected to cause a particular change to the DOM if there is benign code operating with respect to the click, as opposed to malicious code operating with respect to the click). Data that characterizes the DOM may also be hashed, either at the client computer or the server system 702, to produce a representation of the DOM (e.g., in the differences between part of the DOM before and after a defined action occurs) that is easy to compare against corresponding representations of DOMs from other client computers. Other techniques may also be used by the instrumentation code to generate a compact representation of the DOM or other structure expected to be affected by malicious code in an identifiable manner.

As noted, the content from web servers 704a-704n, as encoded by decode, analysis, and re-encode module 724, may be rendered on web browsers of various client computers. Uninfected client computers 712a-712n represent computers that do not have malicious code programmed to interfere with a particular site a user visits or to otherwise perform malicious activity. Infected client computers 714a-714n represent computers that do have malware or malicious code (718a-718n, respectively) programmed to interfere with a particular site a user visits or to otherwise perform malicious activity. In certain implementations, the client computers 712a-712n, 714a-714n may also store the encrypted cookies discussed above and pass such cookies back through the network 710. The client computers 712a-712n, 714a-714n will, once they obtain the served content, implement DOMs for managing the displayed web pages, and instrumentation code may monitor the respective DOMs as discussed above. Reports of illogical activity (e.g., software on the client device calling a method that does not exist in the downloaded and rendered content) can then be reported back to the server system.

The reports from the instrumentation code may be analyzed and processed in various manners in order to determine how to respond to particular abnormal events, and to track down malicious code via analysis of multiple different similar interactions across different client computers 712a-712n, 714a-714n. For small-scale analysis, each web site operator may be provided with a single security console 767 that provides analytical tools for a single site or group of sites. For example, the console 767 may include software for showing groups of abnormal activities, or reports that indicate the type of code served by the web site that generates the most abnormal activity. For example, a security officer for a bank may determine that defensive actions are needed if most of the reported abnormal activity for its web site relates to content elements corresponding to money transfer operations—an indication that stale malicious code may be trying to access such elements surreptitiously.

Console 707 may also be multiple different consoles used by different employees of an operator of the system 700, and may be used for pre-analysis of web content before it is served, as part of determining how best to apply polymorphic transformations to the web code. For example, in combined manual and automatic analysis like that described above, an operator at console 707 may form or apply rules 722 that guide the transformation that is to be performed on the content when it is ultimately served. The rules may be written explicitly by the operator or may be provided by automatic analysis and approved by the operator. Alternatively, or in addition, the operator may perform actions in a graphical user interface (e.g., by selecting particular elements from the code by highlighting them with a pointer, and then selecting an operation from a menu of operations) and rules may be written consistent with those actions.

A central security console 708 may connect to a large number of web content providers, and may be run, for example, by an organization that provides the software for operating the security server systems 702a-702n. Such console 708 may access complex analytical and data analysis tools, such as tools that identify clustering of abnormal activities across thousands of client computers and sessions, so that an operator of the console 708 can focus on those clusters in order to diagnose them as malicious or benign, and then take steps to thwart any malicious activity.

In certain other implementations, the console 708 may have access to software for analyzing telemetry data received from a very large number of client computers that execute instrumentation code provided by the system 700. Such data may result from forms being rewritten across a large number of web pages and web sites to include content that collects system information such as browser version, installed plug-ins, screen resolution, window size and position, operating system, network information, and the like. In addition, user interaction with served content may be characterized by such code, such as the speed with which a user interacts with a page, the path of a pointer over the page, and the like.

Such collected telemetry data, across many thousands of sessions and client devices, may be used by the console 708 to identify what is "natural" interaction with a particular page that is likely the result of legitimate human actions, and what is "unnatural" interaction that is likely the result of a bot interacting with the content. Statistical and machine learning methods may be used to identify patterns in such telemetry data, and to resolve bot candidates to particular client computers. Such client computers may then be handled in special manners by the system 700, may be blocked from interaction, or may have their operators notified that their computer is potentially running malicious software (e.g., by sending an e-mail to an account holder of a computer so that the malicious software cannot intercept it easily).

Figure 8:
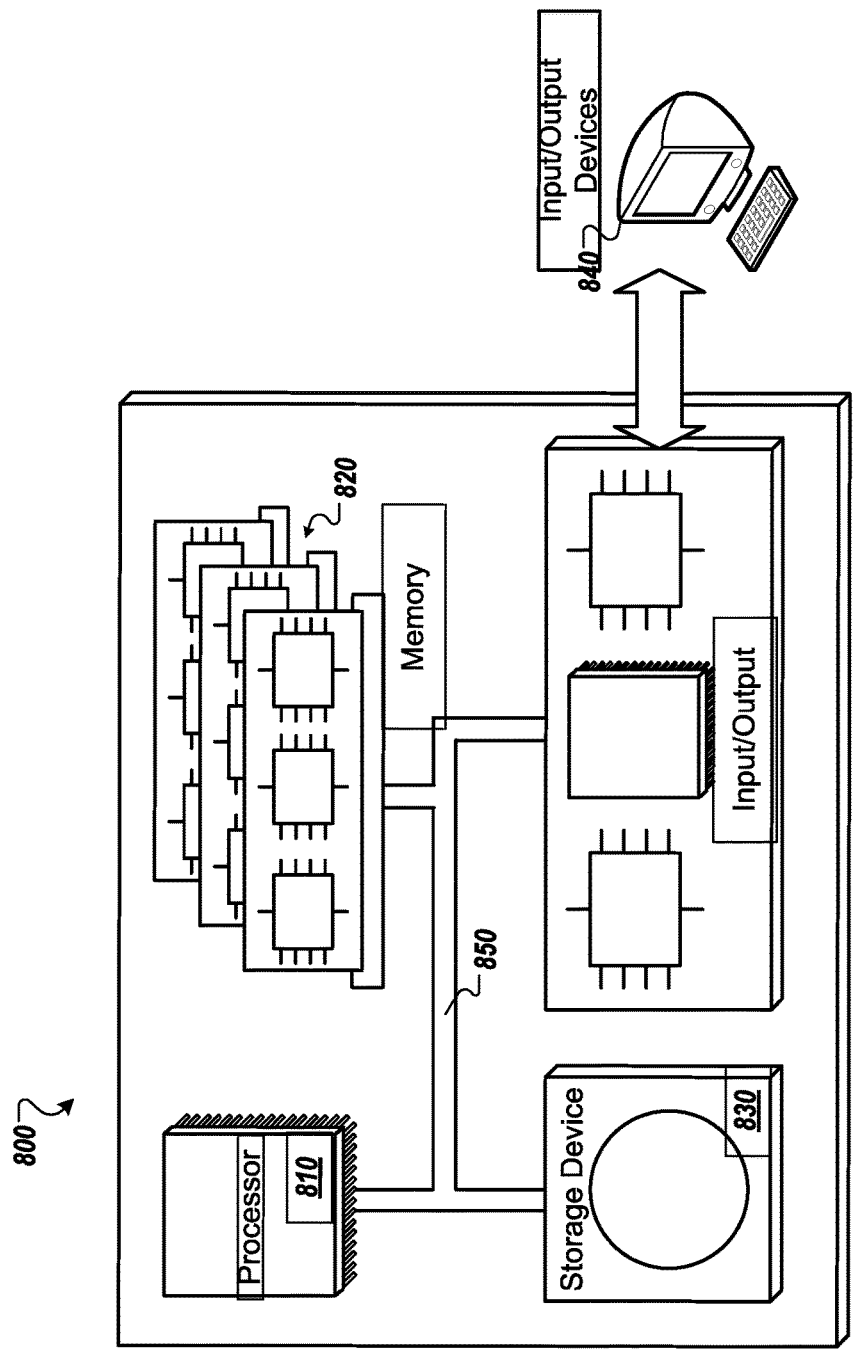
FIG. 8 shows an example computer system.

FIG. 8 shows an example of a computer system 800. The system 800 can be used for the operations described in association with any of the computer-implement methods described previously, according to one implementation. The system 800 is intended to include various forms of digital computers, such as laptops, desktops, workstations, personal digital assistants, servers, blade servers, mainframes, and other appropriate computers. The system 800 can also include mobile devices, such as personal digital assistants, cellular telephones, smartphones, and other similar computing devices. Additionally the system can include portable storage media, such as, Universal Serial Bus (USB) flash drives. For example, the USB flash drives may store operating systems and other applications. The USB flash drives can include input/output components, such as a wireless transmitter or USB connector that may be inserted into a USB port of another computing device.

The system 800 includes a processor 810, a memory 820, a storage device 830, and an input/output device 840. Each of the components 810, 820, 830, and 840 are interconnected using a system bus 850. The processor 810 is capable of processing instructions for execution within the system 800. The processor may be designed using any of a number of architectures. For example, the processor 810 may be a CISC (Complex Instruction Set Computers) processor, a RISC (Reduced Instruction Set Computer) processor, or a MISC (Minimal Instruction Set Computer) processor.

In one implementation, the processor 810 is a single-threaded processor. In another implementation, the processor 810 is a multi-threaded processor. The processor 810 is capable of processing instructions stored in the memory 820 or on the storage device 830 to display graphical information for a user interface on the input/output device 840.

The memory 820 stores information within the system 800. In one implementation, the memory 820 is a computer-readable medium. In one implementation, the memory 820 is a volatile memory unit. In another implementation, the memory 820 is a non-volatile memory unit.

The storage device 830 is capable of providing mass storage for the system 800. In one implementation, the storage device 830 is a computer-readable medium. In various different implementations, the storage device 830 may be a floppy disk device, a hard disk device, an optical disk device, or a tape device.

The input/output device 840 provides input/output operations for the system 800. In one implementation, the input/ output device 840 includes a keyboard and/or pointing device. In another implementation, the input/output device 840 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semi-conductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer. Additionally, such activities can be implemented via touchscreen flat-panel displays and other appropriate mechanisms.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include a local area network ("LAN"), a wide area network ("WAN"), peer-to-peer networks (having ad-hoc or static members), grid computing infrastructures, and the Internet.

The computer system can include clients and servers. A client and server are generally remote from each other and typically interact through a network, such as the described one. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:
   sending a set of instrumentation code to a plurality of client computers;
   receiving a set of telemetry data from the plurality of client computers that executed the set of instrumentation code, wherein the telemetry data comprises screen or browser data;
   analyzing the set of telemetry data to identify one or more clusters of malicious activities;
   associating a security policy with one or more activities in the one or more clusters of malicious activities;
   receiving a resource from a server computer;
   generating a set of modified code that comprises the resource and the set of instrumentation code;
   sending the set of modified code to a particular client computer;
   receiving, from the particular client computer, a report indicating that the particular client computer has performed a particular activity identified to be malicious, and responding with the security policy.

2. The method of claim 1, wherein the security policy is automatically assigned to the one or more clusters of malicious activities.

3. The method of claim 1, further comprising associating the security policy with a particular cluster of the one or more clusters of malicious activities.

4. The method of claim 1, wherein responding with the security policy comprises determining that the particular activity is an activity associated with the security policy.

5. The method of claim 1, wherein analyzing the set of telemetry data to identify one or more clusters of malicious activities comprises determining whether an activity includes a call to a particular method.

6. The method of claim 1, wherein analyzing the set of telemetry data to identify one or more clusters of malicious activities comprises determining whether an activity includes a pattern of user interactions that is inconsistent with human user interactions.

7. The method of claim 1, wherein analyzing the set of telemetry data to identify one or more clusters of malicious activities comprises determining whether an activity includes a user interaction at a first client computer that matches user interactions from other client computers.

* * * * *